(12) United States Patent
Yoshida et al.

(10) Patent No.: US 8,651,219 B2
(45) Date of Patent: Feb. 18, 2014

(54) HYBRID CONSTRUCTION MACHINE

(75) Inventors: Hajime Yoshida, Omihachiman (JP); Hajime Ishii, Higashiomi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 146 days.

(21) Appl. No.: 13/496,395

(22) PCT Filed: May 20, 2011

(86) PCT No.: PCT/JP2011/061689
§ 371 (c)(1),
(2), (4) Date: Mar. 15, 2012

(87) PCT Pub. No.: WO2011/148877
PCT Pub. Date: Dec. 1, 2011

(65) Prior Publication Data
US 2012/0186889 A1 Jul. 26, 2012

(30) Foreign Application Priority Data
May 26, 2010 (JP) ................................. 2010-120797

(51) Int. Cl.
*B60K 17/10* (2006.01)

(52) U.S. Cl.
USPC ........................................ 180/305; 180/307

(58) Field of Classification Search
USPC .................. 180/305, 306, 307, 308
See application file for complete search history.

(56) References Cited

U.S. PATENT DOCUMENTS

| | | | |
|---|---|---|---|
| 5,159,813 A * | 11/1992 | Yoshimatsu et al. | 60/459 |
| 6,009,643 A * | 1/2000 | Maeba et al. | 37/443 |
| 6,170,588 B1 * | 1/2001 | Irino et al. | 180/89.1 |
| 6,171,030 B1 * | 1/2001 | Miyake et al. | 405/258.1 |
| 6,615,942 B2 * | 9/2003 | Shinohara et al. | 180/69.21 |
| 6,757,993 B2 * | 7/2004 | Kondou | 37/348 |
| 6,922,925 B2 * | 8/2005 | Watanabe et al. | 37/466 |
| 7,210,292 B2 * | 5/2007 | Price et al. | 60/426 |
| 7,273,124 B2 * | 9/2007 | Tatsuno et al. | 180/305 |

(Continued)

FOREIGN PATENT DOCUMENTS

| | | |
|---|---|---|
| JP | 2001-173024 A | 6/2001 |
| JP | 2004-084470 A | 3/2004 |

(Continued)

OTHER PUBLICATIONS

International Search Report received in International Application No. PCT/JP2011/061689 dated Mar. 15, 2012.

*Primary Examiner* — Jeffrey J Restifo
(74) *Attorney, Agent, or Firm* — Mattingly & Malur, PC

(57) ABSTRACT

Provided is a hybrid construction machine capable of facilitating the hybridization (conversion, redesigning, etc. into a hybrid construction machine) even for construction machines of the minimal tail swing radius type or the minimal swing radius type. A hybrid mini-shovel of the minimal tail swing radius type comprises an engine, a hydraulic pump whose input shaft is coaxially connected to the output shaft of the engine, a generator/motor whose rotating shaft is connected to the output shaft of the engine and the input shaft of the hydraulic pump via a gear mechanism, and a battery which receives and supplies electric power from/to the generator/motor. The generator/motor is placed at a vertical position where its lower end is situated above the shaft center of the input shaft of the hydraulic pump, and when viewed from above at a horizontal position where it overlaps with the hydraulic pump.

4 Claims, 17 Drawing Sheets

(56) References Cited

U.S. PATENT DOCUMENTS

| | | | |
|---|---|---|---|
| 7,320,380 B2 * | 1/2008 | Ueda et al. | 180/327 |
| 7,503,419 B2 * | 3/2009 | Miyake | 180/327 |
| 7,506,717 B2 * | 3/2009 | Tatsuno et al. | 180/307 |
| 8,037,963 B2 * | 10/2011 | Nishimura et al. | 180/291 |
| 8,186,156 B2 * | 5/2012 | Kamiya et al. | 60/420 |
| 8,322,481 B2 * | 12/2012 | Satake et al. | 180/307 |
| 2004/0098983 A1 * | 5/2004 | Naruse et al. | 60/428 |
| 2005/0036894 A1 | 2/2005 | Oguri | |
| 2009/0084003 A1 * | 4/2009 | Nobayashi et al. | 37/347 |
| 2009/0199553 A1 * | 8/2009 | Nishimura et al. | 60/486 |
| 2010/0038162 A1 * | 2/2010 | Kamiya et al. | 180/69.6 |
| 2012/0330516 A1 * | 12/2012 | Horii | 701/50 |

FOREIGN PATENT DOCUMENTS

| | | |
|---|---|---|
| JP | 2004-169465 A | 6/2004 |
| JP | 2006-002478 A | 1/2006 |
| JP | 2007-056627 A | 3/2007 |
| JP | 2007-062506 A | 3/2007 |

* cited by examiner (A)

(B)

(A)

(B)

HYBRID CONSTRUCTION MACHINE

TECHNICAL FIELD

The present invention relates to a hybrid construction machine comprising a generator/motor connected to both an engine and a hydraulic pump. The invention more particularly relates to a hybrid construction machine of the minimal tail swing radius type or the minimal swing radius type.

BACKGROUND ART

A hydraulic shovel, as a type of construction machine, generally comprises a lower travel structure, an upper swing structure which is mounted on the lower travel structure to be capable of swiveling, and a multijoint work implement (including a boom, an arm and a bucket) which is connected to the upper swing structure to be capable of increasing/decreasing its elevation angle. A hydraulic driving device for the hydraulic shovel includes, for example, a hydraulic pump which is driven by the engine, a plurality of hydraulic actuators (specifically, traveling hydraulic motors, a boom hydraulic cylinder, an arm hydraulic cylinder, a bucket hydraulic cylinder, etc.) which are driven by hydraulic fluid from the hydraulic pump, and a control valve which controls the flow of the hydraulic fluid from the hydraulic pump to the hydraulic actuators in response to the operator's operation on controller devices.

An engine-powered hydraulic shovel is equipped with only an engine as the power source for the hydraulic pump. Among such engine-powered hydraulic shovels, some types of mini-shovels suitable for operations in small or restricted worksites, called "minimal tail swing radius type" or "minimal swing radius type", are known (see Patent Literatures 1 and 2, for example). A minimal tail swing radius mini-shovel described in the Patent Literature 1 has the work implement connected to the front of the upper swing structure via a swing post and is designed so that the swing radius (turning radius) of the rear end of the upper swing structure substantially fits in the overall width of the lower travel structure. In a minimal swing radius mini-shovel described in the Patent Literature 2, the work implement is connected to a part of the upper swing structure closer to its swiveling center so that the upper swing structure with the work implement can swing substantially within the overall width of the lower travel structure.

In the mini-shovels described in the Patent Literatures 1 and 2, the upper swing structure includes a swiveling frame which forms the substructure of the upper swing structure, a counter weight which is provided at a rear end position on the swiveling frame to cover the rear of the engine arranged on the swiveling frame, a floor member which is mounted on the swiveling frame to extend substantially across the total length of the swiveling frame in its longitudinal direction and which includes a floor plate serving as the foothold for the operator and a cab seat pedestal extending upward from the rear of the floor plate to overhang rearward and cover the front and top of the engine, and a support member which is mounted on the swiveling frame to extend over components such as the engine and support a rear part of the floor member. In short, due to the restriction on the dimensions of the upper swing structure in horizontal directions, the cab is formed on the floor member, the engine room (machine room) is formed to be separated from the cab by the cab seat pedestal of the floor member (i.e., to get into the space under the rear part of the floor member), and the engine, etc. are arranged in the engine room.

The engine is mounted transversely (to extend in the transverse direction) and is supported by support brackets and vibration-proof mounts. The left-hand end of the output shaft of the engine is coaxially connected to the input shaft of the hydraulic pump so that the hydraulic pump is integrally combined with the engine. The right-hand end of the output shaft of the engine is connected to the rotating shaft of a cooling fan via a power transmission mechanism (specifically, pulleys, fan belt, etc.). Heat exchangers such as a radiator and an oil cooler are arranged to the right of the cooling fan. Tanks such as a fuel tank and a hydraulic fluid tank are arranged in front of the heat exchangers (i.e., to the right of the floor member). Further, a control valve (control valve unit) is arranged under the floor plate of the floor member.

Incidentally, hybrid hydraulic shovels equipped with a generator/motor (rotating electric machine) are being proposed in recent years (see Patent Literature 3, for example) from the viewpoints of increasing the fuel efficiency, improving the exhaust gas characteristics, reducing the noise, etc. In the hybrid hydraulic shovel described in the Patent Literature 3, the rotating shaft of the generator/motor is connected to the output shaft of the engine and the input shaft of the hydraulic pump via a gear mechanism. The generator/motor has both the function of an electric generator which is driven by the output power of the engine and thereby generates electric power and the function of an electric motor which is driven by electric power from a battery and thereby serves as an auxiliary power source for the hydraulic pump.

PRIOR ART LITERATURE

Patent Literature

Patent Literature 1: JP,A 2006-2478
Patent Literature 2: JP,A 2007-56627
Patent Literature 3: JP,A 2001-173024

SUMMARY OF THE INVENTION

Problem to be Solved by the Invention

The conventional hybrid hydraulic shovels described above are targeted for middle-sized or large-sized hydraulic shovels (operating weight: 6 tons or more) or some of mini-shovels (operating weight: less than 6 tons) called "standard machine type" and having a large swing radius of the upper swing structure. In such hydraulic shovels, it is easy to mount a power unit (made up of the engine, the hydraulic pump and the generator/motor) on the swiveling frame. However, the mounting of the power unit on the swiveling frame becomes difficult in mini-shovels of the minimal tail swing radius type or the minimal swing radius type having a small swing radius of the upper swing structure. Specifically, the restriction on the dimension of the upper swing structure in the transverse direction (width direction) makes it difficult to arrange the engine, the hydraulic pump and the generator/motor in series (series connection) in the transverse direction. Further, the restriction on the dimension of the upper swing structure in the longitudinal direction (lengthwise direction) makes it difficult to arrange the hydraulic pump and the generator/motor in parallel with the engine (parallel connection) in the longitudinal direction. Therefore, it has been difficult to realize hybridization (conversion, redesigning, etc. into a hybrid mini-shovel) of such mini-shovels.

Fundamentally, hybrid hydraulic shovels of the minimal tail swing radius type or the minimal swing radius type are desired to be developed as special-purpose models, that is, hydraulic shovels totally different from the engine-powered hydraulic shovels of the minimal tail swing radius type or the minimal swing radius type. However, in order to early supply the hybrid hydraulic shovels to the market, it is desirable to utilize the already-existing engine-powered hydraulic shovels of the minimal tail swing radius type or the minimal swing radius type and arrange the devices (components) of the hydraulic shovels so as to facilitate the hybridization. That is because such an approach reduces the costs for development and manufacture while also facilitating the conversion from the already-existing engine-powered hydraulic shovels to hybrid hydraulic shovels.

The object of the present invention, which has been made in consideration of the situation described above, is to provide a hybrid construction machine capable of facilitating the hybridization (conversion, redesigning, etc. into a hybrid construction machine) even for construction machines of the minimal tail swing radius type or the minimal swing radius type.

Means for Solving the Problem (1) In order to achieve the above object, the present invention provides a hybrid construction machine of minimal tail swing radius type or minimal swing radius type comprising: a lower travel structure; an upper swing structure which is mounted on the lower travel structure to be capable of swiveling; a work implement which is connected to the upper swing structure to be capable of increasing and decreasing its elevation angle; a plurality of hydraulic actuators including a traveling hydraulic motor; an engine; a hydraulic pump having an input shaft coaxially connected to an output shaft of the engine and supplying hydraulic fluid to the hydraulic actuators; a generator/motor whose rotating shaft is connected to the output shaft of the engine and the input shaft of the hydraulic pump via a gear mechanism; and an electricity storage device which receives and supplies electric power from/to the generator/motor. The upper swing structure includes: a swiveling frame which forms the substructure of the upper swing structure; a counter weight which is provided at a rear end position on the swiveling frame to cover the rear of the engine; a floor member which is mounted on the swiveling frame, the floor member including a floor plate serving as the foothold for the operator and a cab seat pedestal extending upward from the rear of the floor plate to overhang rearward and cover the front and top of the engine; and a support member which is mounted on the swiveling frame to extend over components such as the engine and support a rear part of the floor member. The generator/motor is placed at a vertical position where the lower end of the generator/motor is situated above the shaft center of the input shaft of the hydraulic pump and at a horizontal position where the generator/motor overlaps with the hydraulic pump when viewed from above.

In the engine-powered construction machines (i.e., construction machines equipped with only an engine as the power source for the hydraulic pump) of the minimal tail swing radius type or the minimal swing radius type, the upper swing structure is designed so that the swing radius of the rear end or the whole of the upper swing structure substantially fits in the overall width of the lower travel structure and the support member for supporting the rear part of the floor member is provided to extend over the engine. Therefore, a dead space is caused over the hydraulic pump (in the Patent Literature 2, for example, part of the space over the hydraulic pump is used for arranging the exhaust muffler, etc.).

In the hybrid construction machine (i.e., construction machine equipped with a generator/motor connected to the engine and the hydraulic pump) in accordance with the present invention, the generator/motor is arranged by efficiently utilizing the aforementioned space over the hydraulic pump on the basis of the engine-powered construction machine of the minimal tail swing radius type or the minimal swing radius type. Specifically, the generator/motor is placed at a vertical position where its lower end is situated above the input shaft of the hydraulic pump, and when viewed from above at a horizontal position where it overlaps with the hydraulic pump.

Further, in the hybrid construction machine in accordance with the present invention in which the generator/motor performs assistant driving of the hydraulic pump, the engine and its auxiliary devices (e.g., exhaust muffler) can be downsized compared to those in the engine-powered construction machines by reducing the output power of the engine. By the downsizing of the engine and its auxiliary devices, the space for arranging the gear mechanism can be secured and the space over the hydraulic pump (i.e. the space for arranging the generator/motor) can be reserved securely.

Thus, in the hybridization (conversion, redesigning, etc. into a construction machine) based on an engine-powered construction machine of the minimal tail swing radius type or the minimal swing radius type, the arrangement of the other devices on the swiveling frame (specifically, the heat exchangers, the tanks, etc.) can be kept unchanged. Also for the power unit, the arrangement of the hydraulic pump can be kept unchanged from that in the engine-powered construction machine (since the output shaft of the engine and the input shaft of the hydraulic pump are coaxially connected together similarly to the engine-powered construction machine) and hydraulic pipes connected to the hydraulic pump can be standardized (i.e., the same hydraulic pipes can be used in common for both engine-powered construction machines and hybrid construction machines). As above, according to the present invention, the hybridization can be facilitated even for construction machines of the minimal tail swing radius type or the minimal swing radius type.

(2) Preferably, the above hybrid construction machine (1) further comprises: a traveling speed selector switch capable of commanding switching of the traveling hydraulic motor between a low-speed large-displacement mode and a high-speed small-displacement mode; and a control device which executes control to compensate for shortage of output torque of the engine by making the generator/motor operate as an electric motor by driving the generator/motor with electric power from the electricity storage device in a high-speed traveling state as an operating state in which the traveling speed selector switch is commanding the high-speed small-displacement mode and the traveling controller device is being operated. Output power of the engine is set at a level insufficient for covering hydraulic power required of the hydraulic pump in the high-speed traveling state.

(3) Preferably, the above hybrid construction machine (2) further comprises a gear box which is attached to the engine to store the gear mechanism and support the hydraulic pump and the generator/motor. A plurality of support brackets are attached to the engine and the gear box, and a power unit formed by integrally connecting the engine, the hydraulic pump and the generator/motor together via the gear box is supported on the swiveling frame via the support brackets.

In engine-powered construction machines, the support brackets are generally attached to the engine only and the power unit (made up of the engine and the hydraulic pump integrally connected together) is supported on the swiveling frame via the support brackets. On the other hand, in the above hybrid construction machine (2) in accordance with the present invention in which the engine is downsized compared to that in the engine-powered construction machines by reducing the output power of the engine, the arrangement of the support brackets (i.e., supporting positions of the power unit) is necessitated to differ from that in the engine-powered construction machine if the support brackets are attached to the engine only. Therefore, by attaching the support brackets to the engine and the gear box, the supporting positions of the power unit can be made identical with those in the engine-powered construction machine and the swiveling frame can be standardized (i.e., the same swiveling frame can be used in common for both engine-powered construction machines and hybrid construction machines). Consequently, the costs for development and manufacture can be reduced considerably while also facilitating the conversion from already-existing engine-powered hydraulic shovels, etc.

(4) Preferably, in the above hybrid construction machine (3), the generator/motor is placed at a vertical position where the generator/motor does not overlap with the hydraulic pump when viewed from the rear so that the generator/motor does not interfere with components such as the support brackets attached to the gear box.

Effect of the Invention

According to the present invention, the hybridization can be facilitated and implemented with ease even for construction machines of the minimal tail swing radius type or the minimal swing radius type.

MODE FOR CARRYING OUT THE INVENTION

Figure 1:
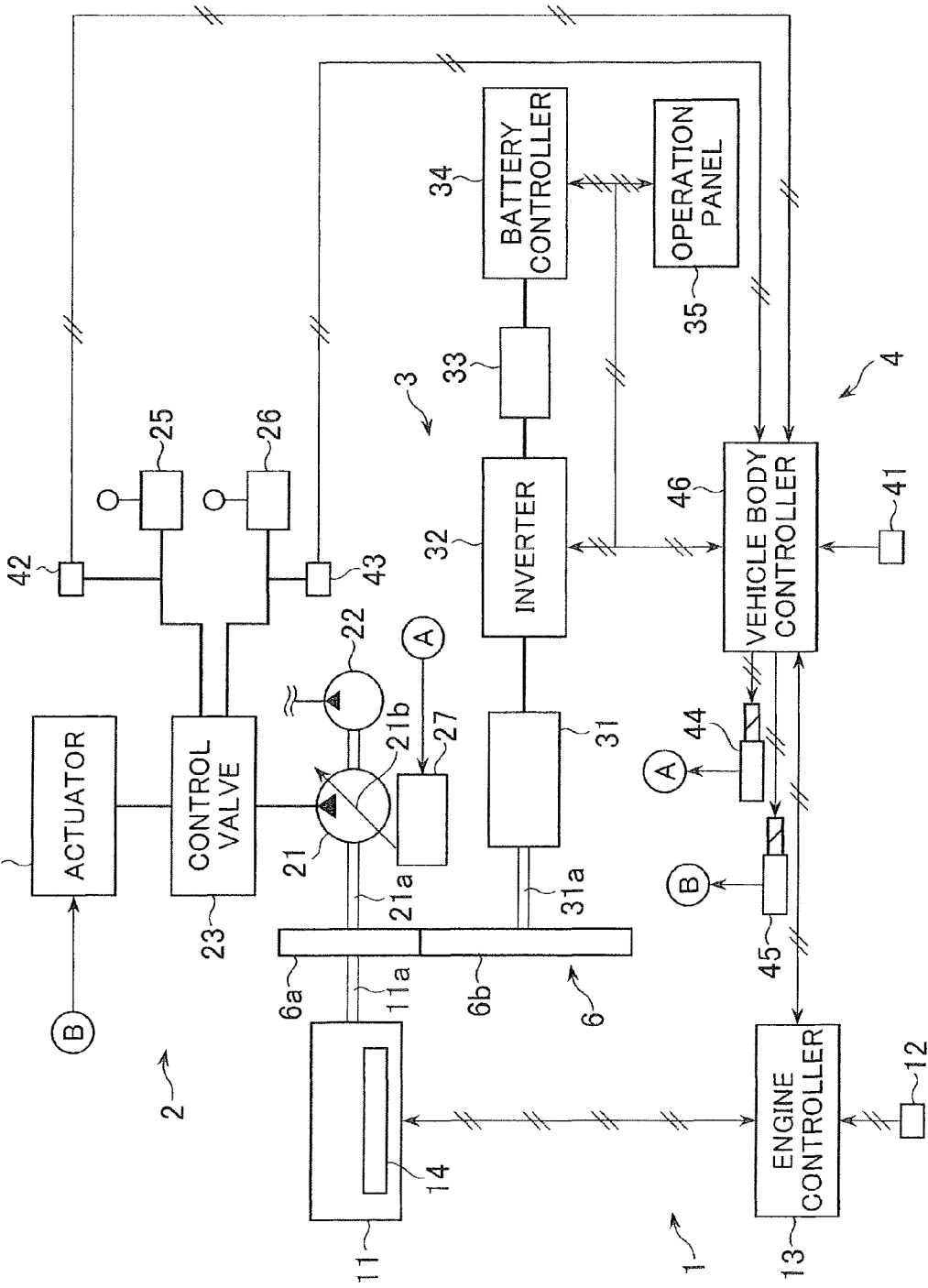
FIG. 1 is a schematic diagram showing the configuration of a driving system of a hybrid mini-shovel in accordance with an embodiment of the present invention.

Referring now to the drawings, a description will be given in detail of an embodiment in accordance with the present invention. This embodiment describes application of the present invention to a mini-shovel as an example of a hybrid construction machine.

First, a driving system of the hybrid mini-shovel in accordance with this embodiment will be described.

FIG. 1 is a schematic diagram showing the configuration of the driving system of the hybrid mini-shovel in accordance with this embodiment.

In FIG. 1, the reference character "1" represents an engine system, "2" represents a hydraulic system, "3" represents a generator/motor system, and "4" represents a control system.

The engine system 1 includes a diesel engine 11, an engine control dial 12, an engine controller 13 and an electronic governor 14.

The engine 11 is a downsized (low power) engine compared to those mounted on engine-powered mini-shovels as will be explained later. The engine control dial 12 indicates and commands a target revolution speed of the engine according to the operation by the operator. The engine controller 13 receives a target revolution speed signal from the engine control dial 12, determines a target fuel injection quantity through a prescribed calculation process, controls the electronic governor 14 accordingly, thereby controls the amount of the fuel injected into each cylinder of the engine (fuel injection quantity), and thereby controls the output torque and the revolution speed of the engine. The engine controller 13 also generates engine load factor information by calculating an engine load factor. The engine load factor can be determined by calculating the ratio of the target fuel injection quantity to a maximum fuel injection quantity, for example.

The hydraulic system 2 includes a hydraulic pump 21, a pilot pump 22, a control valve 23, a plurality of hydraulic actuators and a plurality of controller devices 25 and 26. Specifically, the hydraulic actuators may include, for example, right and left traveling hydraulic motors 24a and 24b, a boom hydraulic cylinder 24c, an arm hydraulic cylinder 24d, a bucket hydraulic cylinder 24e, a swiveling hydraulic motor 24f, a swing hydraulic cylinder 24g, a blade hydraulic cylinder 24h, etc. The swiveling hydraulic motor 24f may also be replaced with a swiveling electric motor. Incidentally, the controller device 25 collectively represents controller devices for the right/left traveling and the controller device 26 collectively represents controller devices for movements other than the traveling.

An output shaft 11a of the engine 11 is coaxially connected to an input shaft 21a of the hydraulic pump 21. The hydraulic pump 21 and the pilot pump 22 are driven by the engine 11. The hydraulic pump 21 of the variable displacement type is equipped with a displacement volume variable control mechanism 21b (e.g., swash plate) and a pump regulator 27 which controls the displacement of the hydraulic pump by adjusting the tilting position of the displacement volume variable control mechanism 21b. Although details are not shown in the figures, the control valve 23 includes a plurality of main spools corresponding to the hydraulic actuators 24a-24h. These main spools are operated and switched by hydraulic signals (operating pilot pressures) outputted by the controller devices 25 and 26. Via the main spools controlled as above, the hydraulic fluid from the hydraulic pump 21 is supplied to the hydraulic actuators 24a-24h and drives corresponding parts (driven parts) of the hybrid mini-shovel.

The generator/motor system 3 includes a generator/motor 31, an inverter 32, a battery (electricity storage device) 33, a battery controller 34 and an operation panel 35.

A rotating shaft 31a of the generator/motor 31 is connected to the output shaft 11a of the engine 11 and the input shaft 21a of the hydraulic pump 21 via a gear mechanism 6 including a large-diameter gear 6a and a small-diameter gear 6b. When the engine 11 has surplus torque, for example, the generator/motor 31 is driven by the surplus torque and operates as an electric generator. The electric power generated by the generator/motor 31 is stored in the battery 33 via the inverter 32. In contrast, when the electric amount (i.e., the amount of stored electricity) of the battery 33 is a prescribed amount or more and the hydraulic pump 21 has to be assisted and driven (assistant driving), for example, the generator/motor 31 is supplied with the electric power of the battery 33 via the inverter 32 and thereby operates as an electric motor. The battery controller 34 monitors the electric amount of the battery 33, while the operation panel 35 displays information related to the electric amount (electricity storage information).

The control system 4 includes a traveling speed selector switch 41, an operating pilot pressure sensor 42 for the traveling, an operating pilot pressure sensor 43 for movements other than the traveling, a torque control solenoid valve 44, a traveling speed switching solenoid valve 45 and a vehicle body controller 46 (control device).

The vehicle body controller 46 is electrically connected to the traveling speed selector switch 41, the operating pilot pressure sensors 42 and 43, the torque control solenoid valve 44 and the traveling speed switching solenoid valve 45. The vehicle body controller 46 is electrically connected also to the inverter 32, the battery controller 34 and the engine controller 13. The vehicle body controller 46 receives an instruction signal from the traveling speed selector switch 41, detection signals from the operating pilot pressure sensors 42 and 43, the electricity storage information from the battery controller 34 and the engine load factor information from the engine controller 13. The vehicle body controller 46 executes a prescribed calculation process based on the inputted signals and information and thereby outputs control signals to the inverter 32, the torque control solenoid valve 44 and the traveling speed switching solenoid valve 45.

Figure 2:
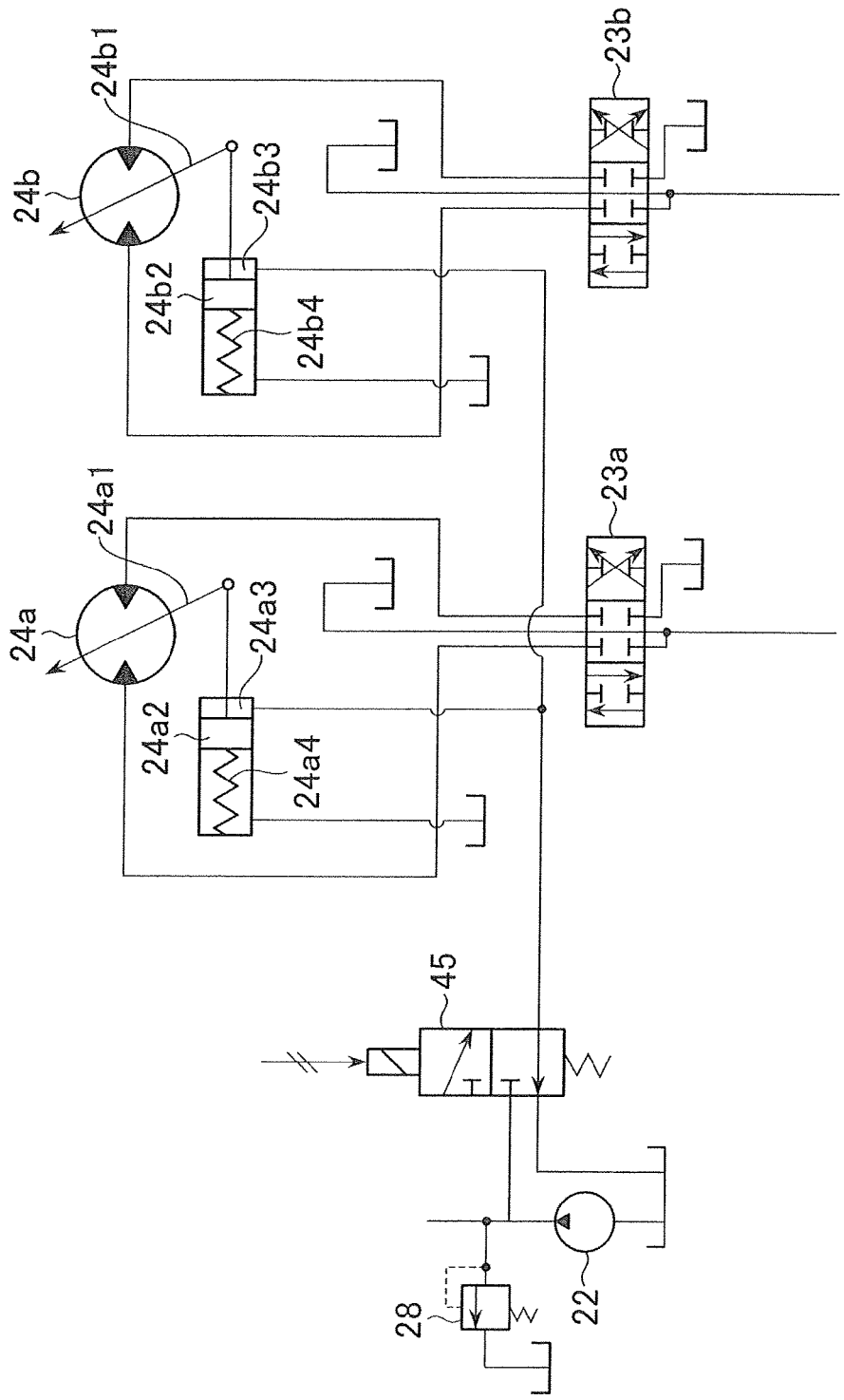
FIG. 2 is a schematic diagram showing details of a hydraulic circuit related to right and left traveling hydraulic motors together with a traveling speed switching solenoid valve.

FIG. 2 is a schematic diagram showing details of a hydraulic circuit related to the right and left traveling hydraulic motors 24a and 24b together with the traveling speed switching solenoid valve 45.

In FIG. 2, the reference characters "23a" and "23b" represent the main spools for the right/left traveling installed in the control valve 23. These main spools 23a and 23b are operated and switched by hydraulic signals (operating pilot pressures) outputted by the traveling controller device 25. Via the main spools 23a and 23b controlled as above, the hydraulic fluid from the hydraulic pump 21 is supplied to the right and left traveling hydraulic motors 24a and 24b and drives right and left driving wheels of the hybrid mini-shovel.

The traveling hydraulic motor 24a of the variable displacement type includes a displacement volume variable control mechanism (swash plate) 24a1 and a control piston 24a2 for driving the displacement volume variable control mechanism 24a1. A pressure receiving part 24a3 is formed on one side of the control piston 24a2 and a spring 24a4 is arranged on the other side of the control piston 24a2. Similarly, the traveling hydraulic motor 24b of the variable displacement type includes a displacement volume variable control mechanism (swash plate) 24b1 and a control piston 24b2 for driving the displacement volume variable control mechanism 24b1. A pressure receiving part 24b3 is formed on one side of the control piston 24b2 and a spring 24b4 is arranged on the other side of the control piston 24b2.

When the traveling speed switching solenoid valve 45 is at the illustrated OFF position, for example, the pressure receiving part 24a3 of the control piston 24a2 and the pressure receiving part 24b3 of the control piston 24b2 are connected with the tank. Thus, the control pistons 24a2 and 24b2, biased by the springs 24a4 and 24b4, stay at the illustrated positions and the displacement volume variable control mechanisms 24a1 and 24b1 are held at large-tilt positions (large-displacement positions). When the displacement volume variable control mechanisms 24a1 and 24b1 are at the large-tilt positions, the traveling hydraulic motors 24a and 24b are capable of low-speed revolution and thus remain in a state suitable for low-speed traveling. This state will hereinafter be referred to as a "low-speed large-displacement mode" of the traveling hydraulic motors 24a and 24b.

In contrast, when the traveling speed switching solenoid valve 45 is switched to its ON position, the discharge pressure of the pilot pump 22 is led to the pressure receiving part 24a3 of the control piston 24a2 and the pressure receiving part 24b3 of the control piston 24b2 as control pressure. By the control pressure, the control pistons 24a2 and 24b2 are operated and the displacement volume variable control mechanisms 24a1 and 24b1 are switched from the large-tilt positions (large-displacement positions) to small-tilt positions (small-displacement positions). When the displacement volume variable control mechanisms 24a1 and 24b1 are at the small-tilt positions, the traveling hydraulic motors 24a and 24b are capable of high-speed revolution and thus remain in a state suitable for high-speed traveling. This state will hereinafter be referred to as a "high-speed small-displacement mode" of the traveling hydraulic motors 24a and 24b. Incidentally, the discharge pressure of the pilot pump 22 is kept at a constant level (e.g., 4 Mpa) by a pilot relief valve 28.

Figure 3:
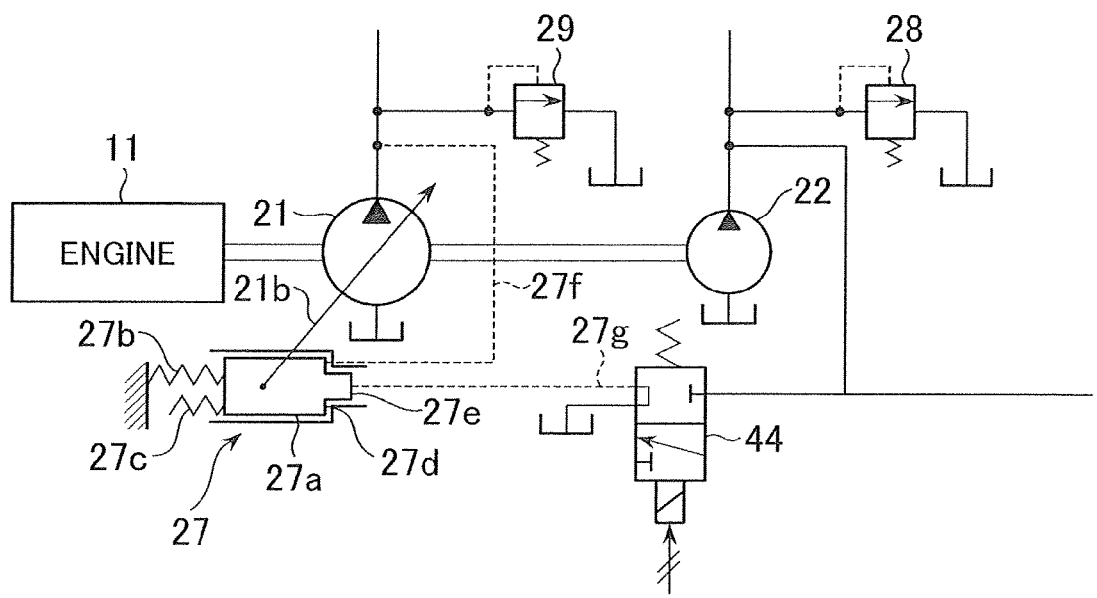
FIG. 3 is a schematic diagram showing details of a torque control unit of a pump regulator.

FIG. 3 is a schematic diagram showing details of a torque control unit of the pump regulator 27 together with the torque control solenoid valve 44, wherein the gear mechanism 6 is unshown for convenience.

The pump regulator 27 includes a required flow rate response control unit (unshown) and a torque control unit (see FIG. 3). The required flow rate response control unit (e.g., LS control unit) controls the tilting position of the displacement volume variable control mechanism 21b of the hydraulic pump 21 (i.e., controls the displacement of the hydraulic pump) to make the hydraulic pump 21 discharge the hydraulic fluid at a flow rate corresponding to a required flow rate determined based on the operation amounts of the controller devices 25 and 26. The torque control unit controls the maximum tilting position of the displacement volume variable control mechanism 21b of the hydraulic pump 21 (i.e., controls the maximum displacement of the hydraulic pump) according to the discharge pressure of the hydraulic pump 21 so that the maximum absorption torque of the hydraulic pump 21 does not exceed a preset level.

The torque control unit of the pump regulator 27 is made up of a control spool 27a, first and second springs 27b and 27c, and first and second pressure receiving parts 27d and 27e. The control spool 27a is operatively connected to the displacement volume variable control mechanism 21b of the hydraulic pump 21. The first and second springs 27b and 27c act on the control spool 27a in a direction increasing the displacement of the hydraulic pump 21. The first and second pressure receiving parts 27d and 27e act on the spool 27a in a direction decreasing the displacement of the hydraulic pump 21. To the first pressure receiving part 27d, the discharge pressure of the hydraulic pump 21 is introduced via a pilot line 27f. To the second pressure receiving part 27e, control pressure from the torque control solenoid valve 44 is introduced via a control hydraulic line 27g.

The first and second springs 27b and 27c are used for setting the maximum absorption torque of the hydraulic pump 21. The first spring 27b is longer than the second spring 27c. When the control spool 27a is at the illustrated initial position, only the first spring 27b acts on the control spool 27a and biases it rightward in FIG. 3. After the control spool 27a has shifted a certain distance leftward in FIG. 3, the second spring 27c also acts on the control spool 27a. In this state, both the first and second springs 27b and 27c bias the control spool 27a rightward in FIG. 3.

The second pressure receiving part 27e is used for adjusting the maximum absorption torque of the hydraulic pump 21 (torque reduction control). Specifically, when the torque control solenoid valve 44 is at the illustrated OFF position, for example, the second pressure receiving part 27e of the pump regulator 27 is connected with the tank. In contrast, when the torque control solenoid valve 44 is switched to its ON position, the discharge pressure of the pilot pump 22 is led to the second pressure receiving part 27e of the pump regulator 27 as control pressure, by which the torque reduction control is performed (details will be described later).

Figure 4:
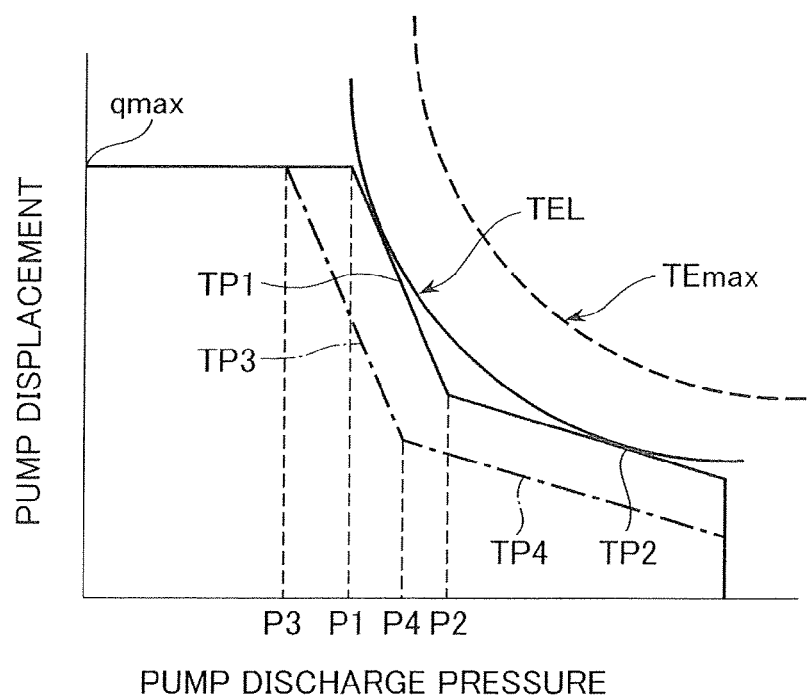
FIG. 4 is a pump torque characteristics diagram showing the function of the torque control unit of the pump regulator.

FIG. 4 is a pump torque characteristics diagram showing the function of the torque control unit of the pump regulator 27, wherein the horizontal axis represents the discharge pressure of the hydraulic pump 21 and the vertical axis represents the displacement of the hydraulic pump 21.

In FIG. 4, the bent line made up of two straight lines (solid lines) TP1 and TP2 represents a maximum absorption torque characteristic that is set by the first and second springs 27b and 27c. The bent line made up of two straight lines (chain lines) TP3 and TP4 represents a maximum absorption torque characteristic adjusted by the torque reduction control by the control pressure from the torque control solenoid valve 44. The curved line TEL represents restricted torque of the engine 11 that has been set to be lower than the maximum output torque TEmax of the engine 11 by a prescribed margin.

When the torque control solenoid valve 44 is at the OFF position shown in FIG. 3, the second pressure receiving part 27e of the pump regulator 27 is connected with the tank and the maximum absorption torque characteristic is set by the first and second springs 27b and 27c to the characteristic indicated by the bent line made up of the straight lines TP1 and TP2. In this case, before the increasing discharge pressure of the hydraulic pump 21 exceeds a first value P1, hydraulic force on the first pressure receiving part 27d (to which the discharge pressure of the hydraulic pump 21 is led) is weaker than the biasing force of the first spring 27b, and thus the maximum displacement of the hydraulic pump 21 is kept at qmax. In other words, the displacement of the hydraulic pump 21 is allowed to increase up to qmax under the control of the required flow rate response control unit.

When the discharge pressure of the hydraulic pump 21 increases further and exceeds the first value P1, the hydraulic force on the first pressure receiving part 27d (to which the discharge pressure of the hydraulic pump 21 is led) exceeds the biasing force of the first spring 27b. In this case, the control spool 27a moves leftward in FIG. 3 and the maximum displacement of the hydraulic pump 21 decreases along the straight line TP1 included in the bent line. Thus, the displacement of the hydraulic pump 21, controlled by the required flow rate response control unit, is restricted to the maximum displacement specified by the straight line TP1 and the absorption torque of the hydraulic pump 21 (product of the pump discharge pressure and the displacement) is controlled so as not to exceed the restricted torque TEL of the engine 11.

When the discharge pressure of the hydraulic pump 21 increases further and exceeds a second value P2, the second spring 27c also acts on the control spool 27a, by which the ratio of the moving distance of the control spool 27a to the increase in the discharge pressure of the hydraulic pump 21 (decreasing rate of displacement of the hydraulic pump 21) decreases and the maximum displacement of the hydraulic pump 21 decreases along the straight line TP2 having an easier gradient than the straight line TP1. Also in this case, the absorption torque of the hydraulic pump 21 is controlled so as not to exceed the restricted torque TEL of the engine 11. When the discharge pressure of the hydraulic pump 21 reaches a preset pressure of a main relief valve 29, further increase of the discharge pressure is prevented by the main relief valve 29.

In contrast, when the torque control solenoid valve 44 is switched to the ON position, the control pressure is led to the second pressure receiving part 27e and the hydraulic force on the second pressure receiving part 27e acts on the control spool 27a against the biasing force of the first and second springs 27b and 27c. Thus, the maximum absorption torque setting by the first and second springs 27b and 27c is adjusted to reduce the maximum absorption torque by the hydraulic force on the second pressure receiving part 27e and the maximum absorption torque characteristic shifts from the bent line made up of the straight lines TP1 and TP2 to the bent line made up of the straight lines TP3 and TP4. Consequently, the maximum displacement of the hydraulic pump 21 decreases along the bent line made up of the straight lines TP3 and TP4 with the increase in the discharge pressure of the hydraulic pump 21. The maximum absorption torque of the hydraulic pump 21 (product of the pump discharge pressure and the maximum displacement) in this case is lower than that in the case of the straight lines TP1 and TP2, by which surplus torque of the engine 11 is created in a forceful manner. Such control is called "torque reduction control".

Next, the setting of the output power of the engine 11 will be explained by using a comparative example.

Figure 5:
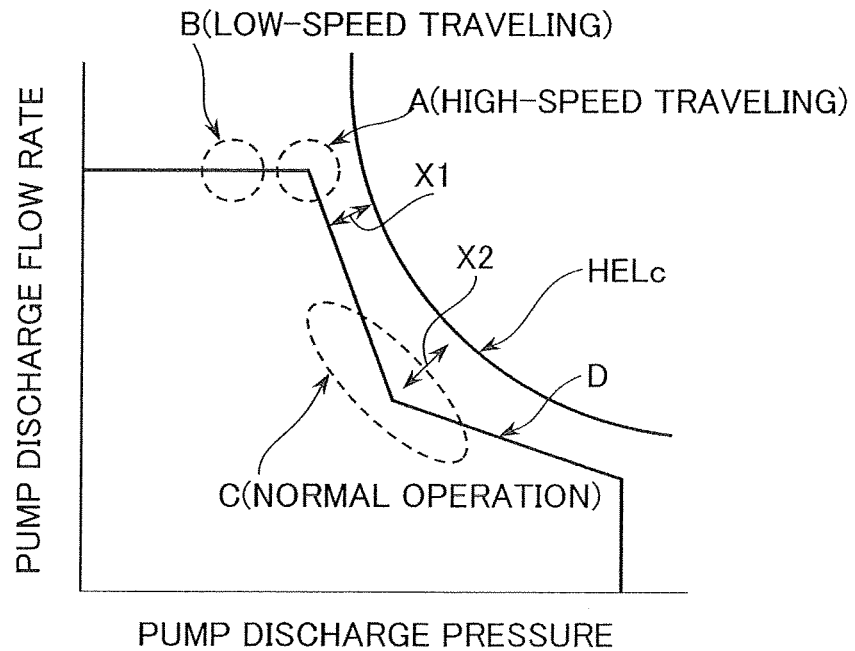
FIGS. 5A and 5B are graphs showing the relationship among an engine output power limiting value, a PQ characteristic (power characteristic) of a hydraulic pump and an output usage range and the relationship between an engine output power characteristic and the output usage range in an engine-powered mini-shovel as a comparative example.
Figure 5:
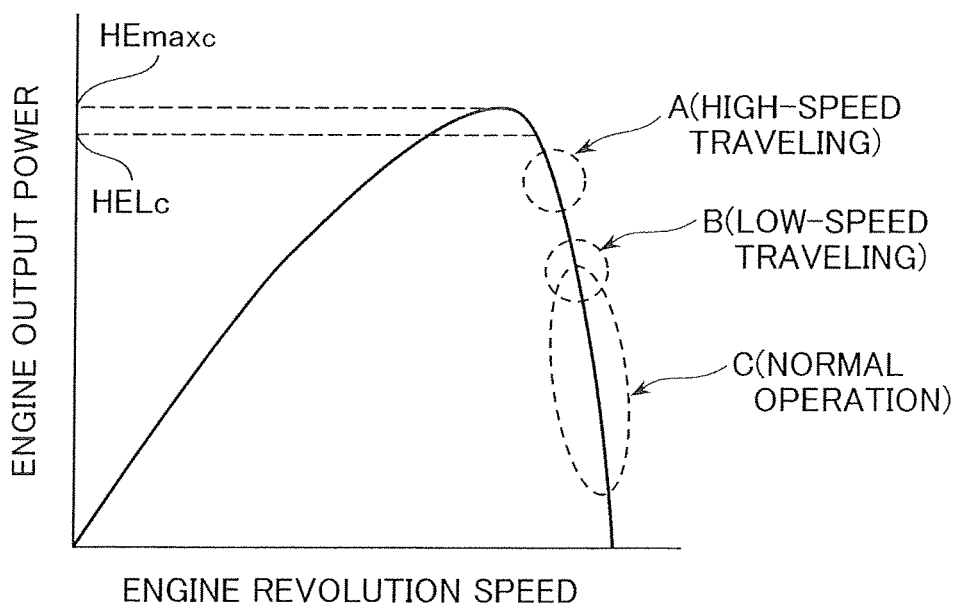

FIG. 5(A) is a graph showing the relationship among an engine output power limiting value, a PQ characteristic (power characteristic) of a hydraulic pump and an output usage range in an engine-powered mini-shovel as the comparative example. FIG. 5(B) is a graph showing the relationship between an engine output power characteristic and the output usage range in the same mini-shovel. In FIG. 5(A), the horizontal axis represents the discharge pressure of the hydraulic pump and the vertical axis represents the discharge flow rate of the hydraulic pump. In FIG. 5(B), the horizontal axis represents the revolution speed of the engine and the vertical axis represents the output power of the engine.

The "PQ characteristic of the hydraulic pump" means the output power characteristic of the hydraulic pump that is achieved when an operation is performed by driving and rotating the hydraulic pump (having a particular maximum absorption torque characteristic) with the engine. The PQ characteristic shown in FIG. 5(A) is of the hydraulic pump 21 having the maximum absorption torque characteristic shown in FIG. 4 in a case where the engine revolution speed is at the rated maximum revolution speed. The engine output power limiting value shown in FIG. 5(A) and the engine output power characteristic shown in FIG. 5(B) are also of the case where the engine revolution speed is at the rated maximum revolution speed.

Three types of operating states of the engine-powered mini-shovel: high-speed traveling, low-speed traveling and normal operation will be considered below. In FIGS. 5(A) and 5(B), the reference character "A" represents the output usage range in the high-speed traveling, "B" represents the output usage range in the low-speed traveling, and "C" represents the output usage range in the normal operation. Here, the "high-speed traveling" means a state in which the engine-powered mini-shovel (construction machine) is traveling (running) with the traveling hydraulic motors 24a and 24b in the high-speed small-displacement mode and with the traveling controller device 25 being operated by the operator. The "low-speed traveling" means a state in which the engine-powered mini-shovel is traveling with the traveling hydraulic motors 24a and 24b in the low-speed large-displacement mode and with the traveling controller device 25 being operated by the operator. The "normal operation" means a state in which the engine-powered mini-shovel is performing an operation with the controller device 26 for movements other than the traveling (especially, a controller device related to the boom hydraulic cylinder 24c, the arm hydraulic cylinder 24d, the bucket hydraulic cylinder 24e or the swiveling motor) being operated by the operator.

In FIGS. 5(A) and 5(B), "HELc" represents the engine output power limiting value and "HEmaxc" represents the maximum output power of the engine. The engine output power limiting value HELc has been set to be lower than the engine maximum output power HEmaxc by a prescribed margin. Specifically, since high speed (high flow rate) is necessary in the high-speed traveling, the output of the hydraulic pump 21 reaches its maximum in the high-speed traveling. The engine output power limiting value HELc has been set by securing a certain margin X1 for the output usage range A of the hydraulic pump 21 in the high-speed traveling.

However, the maximum absorption torque characteristic of the pump regulator 27 has been set by the first and second springs 27b and 27c like the bent line made up of the straight lines TP1 and TP2 as shown in FIG. 4 and the PQ characteristic D of the hydraulic pump 21 shown in FIG. 5(A) is also in a bent-line shape. Therefore, in the normal operation, the output usage range C of the hydraulic pump 21 deviates greatly (X2) from the engine output power limiting value HELc (a state with an excessive margin). This means that the engine output power is not used to its fullest extent.

Figure 6:
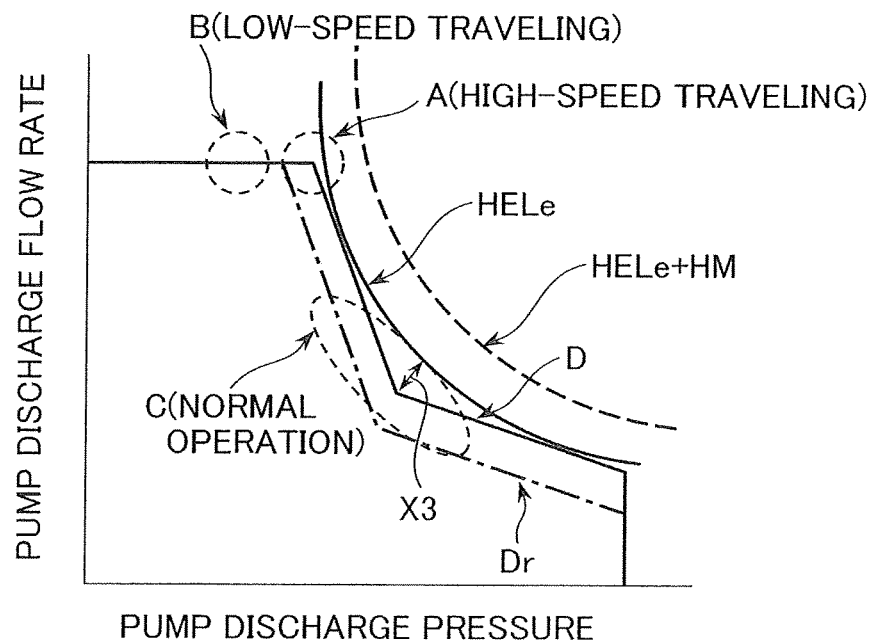
FIGS. 6A and 6B are graphs showing the relationship among the engine output power limiting value, the PQ characteristic (power characteristic) of the hydraulic pump and the output usage range and the relationship between the engine output power characteristic and the output usage range in the hybrid mini-shovel in accordance with the embodiment of the present invention.
Figure 6:
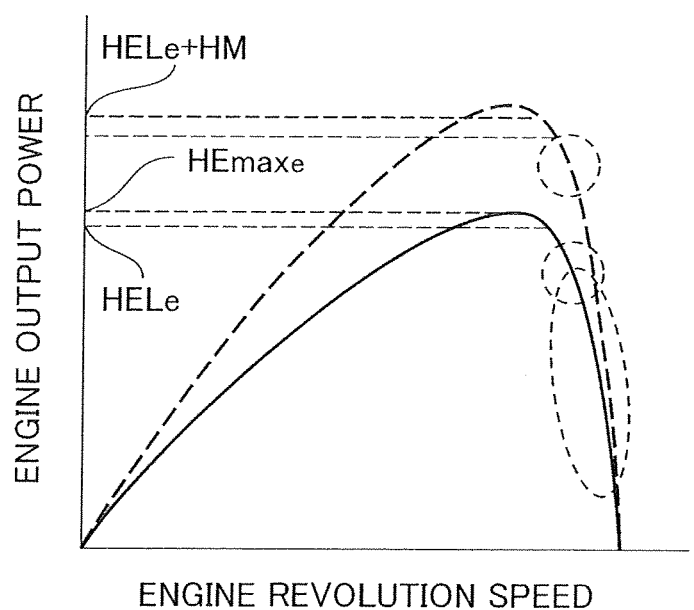

FIG. 6(A) is a graph showing the relationship among the engine output power, the PQ characteristic (power characteristic) of the hydraulic pump and the output usage range in the hybrid mini-shovel of this embodiment. FIG. 6(B) is a graph showing the relationship between the engine output power characteristic and the output usage range in the same hybrid mini-shovel.

In the hybrid mini-shovel of this embodiment, the maximum output power HEmaxe of the engine 11 is set lower than the engine maximum output power HEmaxc (see FIG. 5(B)) of the engine-powered mini-shovel (comparative example) and the engine output power limiting value HELe is set closer to the PQ characteristic D of the hydraulic pump 21. More specifically, the maximum output power HEmaxe of the engine 11 is set to be sufficient for covering the hydraulic power required of the hydraulic pump 21 in the normal operation and in the low-speed traveling (i.e., in operating states other than the high-speed traveling) and to be insufficient for covering the hydraulic power required of the hydraulic pump 21 in the high-speed traveling. The output usage range C in the normal operation is secured by taking advantage of the margin X3 that is caused by the concave part of the PQ characteristic D (bent-line shape) of the hydraulic pump 21.

In the high-speed traveling, output power assistance is performed by operating the generator/motor 31 as an electric motor by use of the electric power from the battery 33. The dotted line HELe+HM in FIGS. 6(A) and 6(B) represents the total sum (total power) of the engine output power HELe and the motor output power HM.

By setting the output power of the engine 11 lower than that in the case where the engine is mounted on an engine-powered mini-shovel and setting the engine output power limiting value HELe closer to the PQ characteristic D of the hydraulic pump 21 as above, the use of the output power of the engine 11 to its fullest extent and the downsizing of the engine 11 (smaller engine) become possible. The downsizing of the engine 11 makes it possible to reduce the fuel consumption, the noise, and the amount of harmful gas emitted from the engine 11. Further, downsizing or simplification of auxiliary devices of the engine 11 becomes possible. In combination with cost reduction achieved by the downsizing of the engine 11, the manufacturing cost of the engine can be reduced considerably and the price of the entire machine can be set more affordably.

Furthermore, the exhaust gas post-processing device (gas purification device) can be left out depending on the output power band of the engine 11, by which the price of the entire machine can be reduced further. Specifically, the present exhaust gas regulation for operating machines (off-road vehicles) is applied to vehicles whose engine output power is 19 kW or higher (not applied to vehicles whose engine output power is less than 19 kW). Thus, it is desirable that an engine with output power of less than 19 kW (free from the exhaust gas regulation), such as an 18 kW engine, be employed as the engine 11 in this embodiment. By setting the engine output power less than 19 kW as above, the need of installing the expensive and complicated exhaust gas post-processing device can be eliminated and the price of the entire machine can be reduced significantly.

In the hybrid mini-shovel in this embodiment, a mechanism for charging the battery 33 is implemented as follows:

For example, when the vehicle body controller 46 (referring to the instruction signal from the traveling speed selector switch 41, the detection signal from the operating pilot pressure sensor 42 and the electricity storage information from the battery controller 34) judges that the charging level of the battery 33 is sufficient (e.g., a charging rate of 30% or higher) when the traveling speed selector switch 41 is indicating (commanding) the high-speed traveling and the traveling controller device 25 is being operated by the operator, the vehicle body controller 46 outputs a control signal to the traveling speed switching solenoid valve 45 and thereby controls the traveling hydraulic motors 24a and 24b in the high-speed small-displacement mode (high-speed traveling). In the high-speed traveling, the vehicle body controller 46 makes the generator/motor 31 operate as an electric motor and perform the output power assistance.

In contrast, when the vehicle body controller 46 judges that the charging level of the battery 33 is insufficient (e.g., a charging rate less than 30%) when the traveling speed selector switch 41 is indicating (commanding) the high-speed traveling and the traveling controller device 25 is being operated by the operator, the vehicle body controller 46 invalidates the command for the high-speed traveling, controls the traveling hydraulic motors 24a and 24b in the low-speed large-displacement mode (low-speed traveling), and charges the battery 33.

The charging of the battery 33 is conducted when the charging level of the battery 33 is judged to be insufficient in an operating state other than the high-speed traveling (specifically, in the low-speed traveling, in the normal operation or in a non-operation state) until the charging rate reaches 70%, for example. Specifically, when the hybrid mini-shovel is judged to be in the non-operation state (in which the traveling controller devices 25 and 26 are not being operated by the operator) or the engine 11 is judged to have surplus torque (e.g., when the engine load factor is 70% or less) based on the load factor information on the engine 11 in the low-speed traveling or in the normal operation, the charging of the battery 33 is conducted without performing the torque reduction control.

In contrast, when the engine 11 is judged not to have surplus torque (e.g., when the engine load factor is over 70%) in the low-speed traveling or in the normal operation, the vehicle body controller 46 outputs a control signal to the torque control solenoid valve 44 and thereby executes the torque reduction control. In other words, the maximum absorption torque characteristic is shifted from the bent line made up of the straight lines TP1 and TP2 to the bent line made up of the straight lines TP3 and TP4 (see FIG. 4) and the PQ characteristic is shifted from the line D to the line Dr (see FIG. 6). By the torque reduction control, the surplus torque or surplus power of the engine 11 is created in a forceful manner through the reduction of the output power of the hydraulic pump 21, thereby conducting the charging of the battery 33.

Next, the structure of the hybrid mini-shovel of this embodiment will be described.

Figure 7:
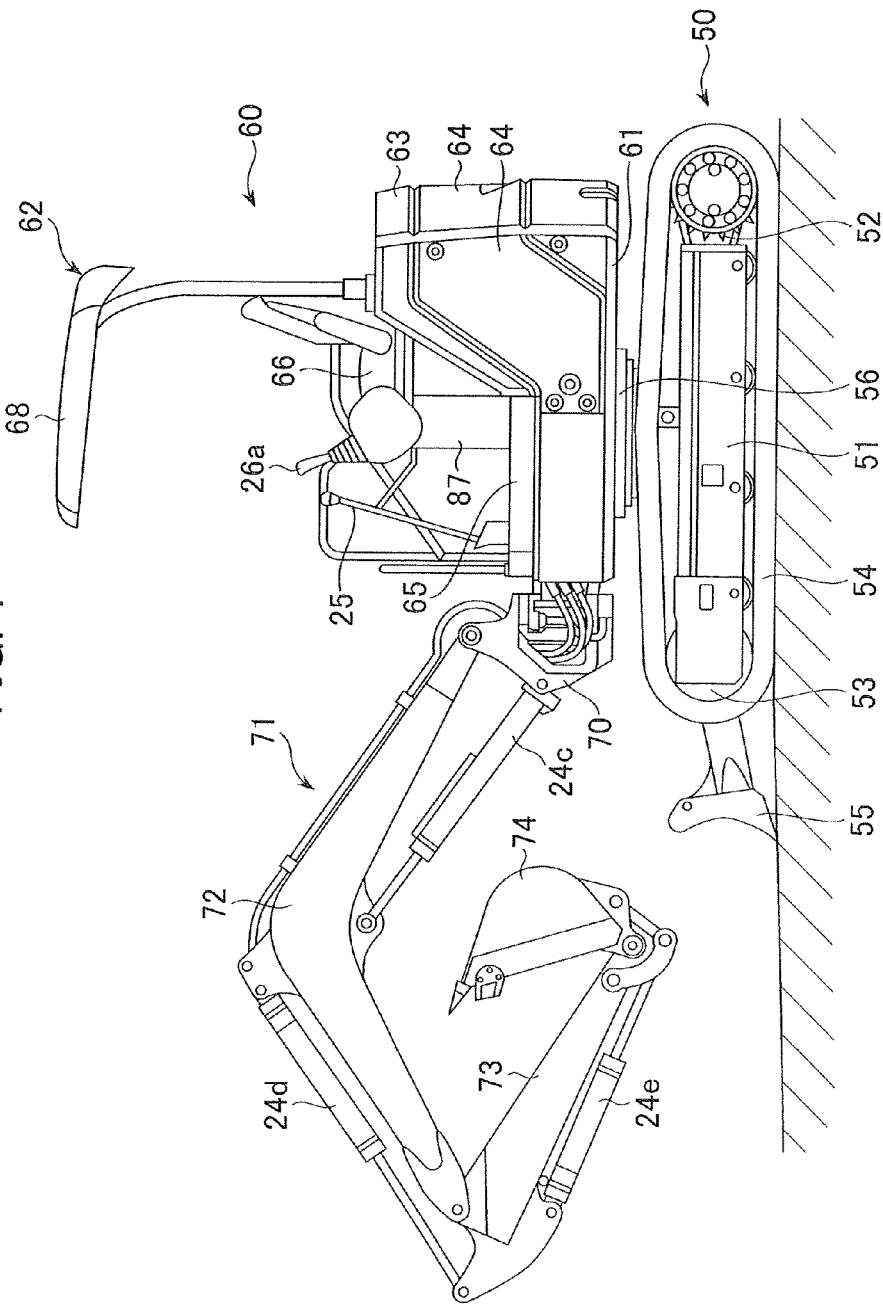
FIG. 7 is a side view showing the external appearance of the hybrid mini-shovel (tilt down state of a cab unit) in accordance with the embodiment of the present invention.
Figure 8:
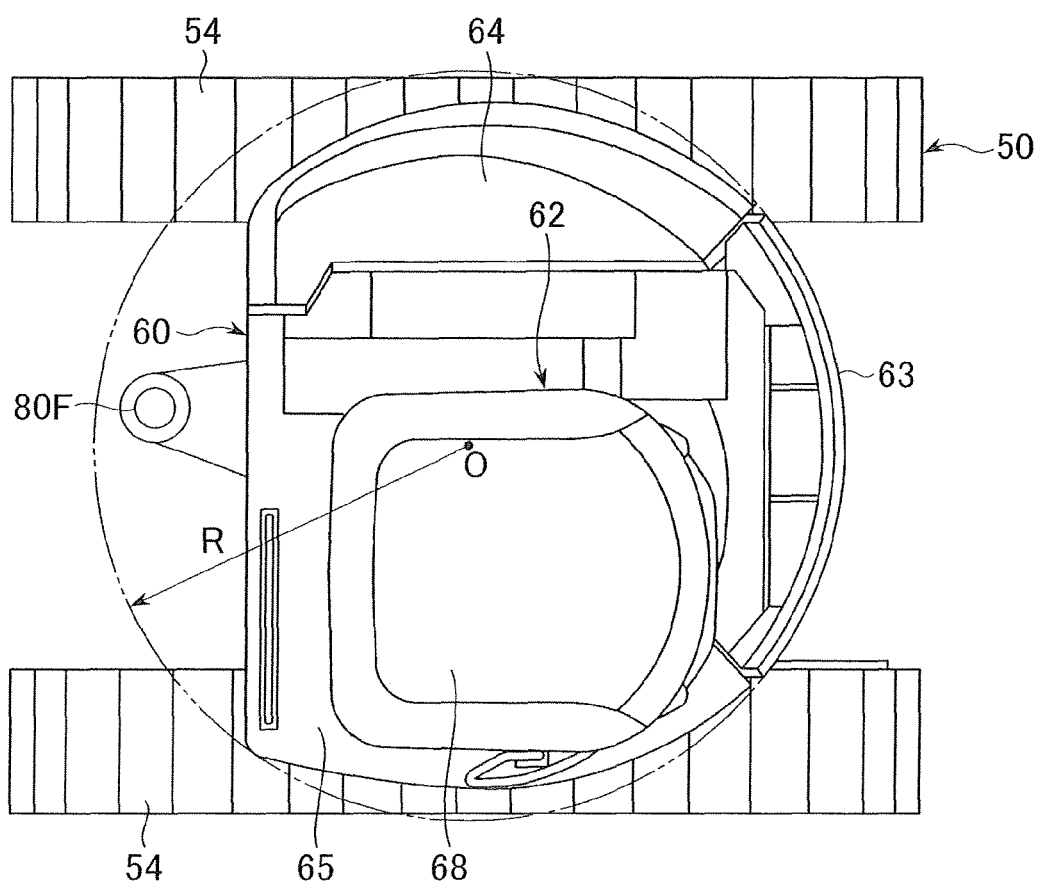
FIG. 8 is a plan view showing the external appearance of the hybrid mini-shovel in accordance with the embodiment of the present invention.

FIG. 7 is a side view showing the external appearance of the hybrid mini-shovel of this embodiment. FIG. 8 is a plan view of the hybrid mini-shovel, where a swing post 70 and a front work implement 71 which will be explained later are unshown for convenience. In the following explanation, directions "front" (left in FIG. 7), "rear" (right in FIG. 7), "right" (behind the sheet of FIG. 7) and "left" (in front of the sheet of FIG. 7) from the viewpoint of the operator seated on the cab seat of the mini-shovel in the state shown in FIG. 7 will be referred to simply as "front", "rear", "right" and "left", respectively.

Referring to FIGS. 7 and 8, the hybrid mini-shovel comprises a lower travel structure 50 of the crawler type, an upper swing structure 60 mounted on the lower travel structure 50 to be capable of swiveling, and a front work implement 71 connected to the front part of the upper swing structure 60 via a swing post 70 to be rotatable (capable of increasing and decreasing its elevation angle) in the vertical direction. This mini-shovel is of the so-called "minimal tail swing radius type", in which the swing radius (turning radius) R of the rear end of the upper swing structure 60 (specifically, the radius R of a locus drawn by the rear face of a counter weight (explained later) when the upper swing structure 60 swivels around the swiveling center O as shown in FIG. 8) substantially fits in the width of the lower travel structure 50.

The lower travel structure 50 includes a track frame 51 in a shape like "H" when viewed from above, right and left driving wheels 52 rotatably supported close to the rear ends of right and left side faces of the track frame 51, right and left driven wheels (idlers) 53 rotatably supported close to the front ends of the right and left side faces of the track frame 51, and right and left crawlers 54 each stretched between the right/left driving wheel 52 and the right/left driven wheel 53. The right and left driving wheels 52 are rotated by the right and left traveling hydraulic motors 24a and 24b, respectively. A blade 55 for removing earth is attached to the front of the track frame 51 to be movable up and down. The blade 55 is moved up and down by the blade hydraulic cylinder 24h. A swiveling wheel 56 is provided at the center of the track frame 51 so that the upper swing structure 60 can be swiveled by the swiveling motor via the swiveling wheel 56.

The swing post 70 is attached to the front of the upper swing structure 60 (specifically, to a swing bracket 80F of a swiveling frame 61 which will be explained later) to be rotatable in the horizontal direction. The swing post 70 is rotated in the horizontal direction by the swing hydraulic cylinder 24g, by which the front work implement 71 is swung right and left.

The front work implement 71 includes a boom 72 connected to the swing post 70 to be rotatable in the vertical direction, an arm 73 connected to the boom 72 to be rotatable in the vertical direction, and a bucket (attachment) 74 connected to the arm 73 to be rotatable in the vertical direction. The rotations of the boom 72, the arm 73 and the bucket 74 in the vertical direction are implemented by the boom hydraulic cylinder 24c, the arm hydraulic cylinder 24d and the bucket hydraulic cylinder 24e, respectively.

The upper swing structure 60 includes a swiveling frame 61, a cab unit 62, a counter weight 63 and a plurality of exterior covers 64. The swiveling frame 61 forms the substructure of the upper swing structure 60. The cab unit 62 is arranged at a front and slightly left position on the swiveling frame 61 to be tiltable around its front end serving as a fulcrum (supporting point). The counter weight 63 is provided at the rear end position on the swiveling frame 61. The exterior covers 64 are attached on the swiveling frame 61 around the cab unit 62 and openings of the counter weight 63.

Figure 9:
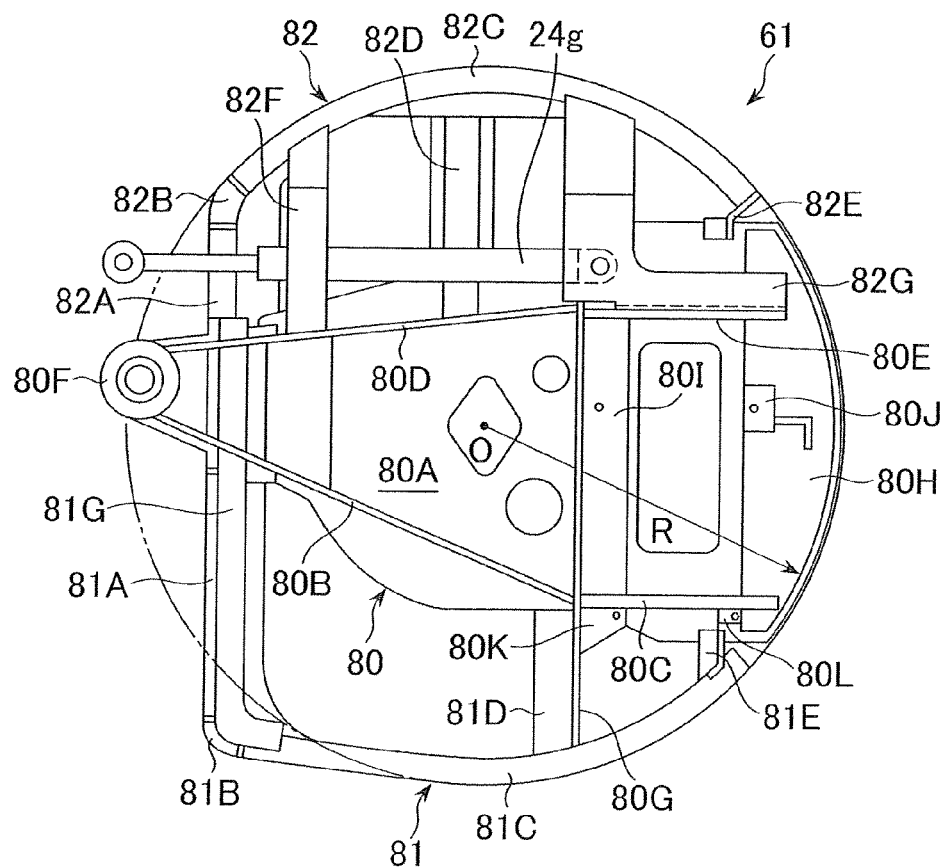
FIG. 9 is a top view showing the structure of a swiveling frame in the embodiment of the present invention.
Figure 10:
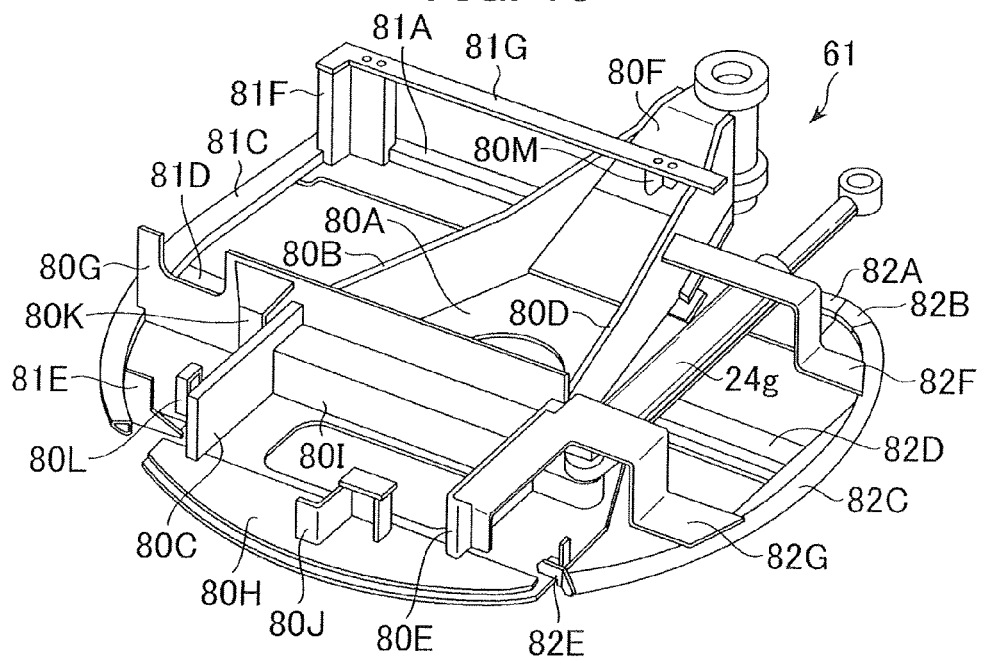
FIG. 10 is a perspective view showing the structure of the swiveling frame in the embodiment of the present invention.

FIGS. 9 and 10 are a top view and a perspective view showing the structure of the swiveling frame 61.

In FIGS. 9 and 10, the swiveling frame 61 is mainly composed of a center frame 80, a left side frame 81 provided to the left of the center frame 80 (below the center frame 80 in FIG. 9, to the left of the center frame 80 in FIG. 10) and a right side frame 82 provided to the right of the center frame 80 (above the center frame 80 in FIG. 9, to the right of the center frame 80 in FIG. 10).

The center frame 80 includes a base plate 80A, longitudinal plates 80B-80E, a swing bracket 80F, a transverse plate 80G and a weight support part 80H. The longitudinal plates 80B-80E (a left front longitudinal plate 80B, a left rear longitudinal plate 80C, a right front longitudinal plate 80D and a right rear longitudinal plate 80E) are erected on the base plate 80A to extend substantially in the longitudinal direction. The swing bracket 80F is joined to front end parts of the base plate 80A and the front longitudinal plates 80B and 80D. The transverse plate 80G is erected on the base plate 80A and joined between the rear end of the right/left front longitudinal plate (80D, 80B) and the front end of the right/left rear longitudinal plate (80E, 80C) to extend in the transverse direction (specifically, to extend between the right and left longitudinal plates and between the left longitudinal plate(s) and the left side frame 81). The weight support part 80H is provided on the base plate 80A and at the rear ends of the rear longitudinal plates 80C and 80E. Between the rear longitudinal plates 80C and 80E, an engine support part 80I and a support fitting 80J are provided to be apart from each other in the longitudinal direction. To the left of the left rear longitudinal plate 80C, support fittings 80K and 80L are provided to be apart from each other in the longitudinal direction.

The right side frame 82 is formed with a pipe material having a cross-sectional shape like "D", for example. The right side frame 82 includes a front frame 82A in a linear shape joined to the right side of the swing bracket 80F to extend in the transverse direction and a curved frame 82C in an arc-like shape connected to an end of the front frame 82A via a joint 82B. A middle part of the curved frame 82C is connected to the base plate 80A via an overhang beam 82D, while a rear end part of the curved frame 82C is connected to the base plate 80A via a connecting fitting 82E.

Between the curved frame 82C and the right front longitudinal plate 80D, a mounting plate 82F (situated in front of the overhang beam 82D) is joined. Between the curved frame 82C and the right rear longitudinal plate 80E, a mounting plate 82G (situated to the rear of the overhang beam 82D) is joined. The mounting plates 82F and 82G are bent in crank-like shapes to secure a space for the swing hydraulic cylinder 24g.

Similarly to the right side frame 82, the left side frame 81 is formed with a pipe material having a cross-sectional shape like "D", for example. The left side frame 81 includes a front frame 81A in a linear shape joined to the left side of the swing bracket 80F to extend in the transverse direction and a curved frame 81C in an arc-like shape connected to an end of the front frame 81A via a joint 81B. A middle part of the curved frame 81C is connected to the base plate 80A via an overhang beam 81D and the transverse plate 80G, while a rear end part of the curved frame 81C is connected to the base plate 80A via a connecting fitting 81E.

A leg plate 81F is erected in the vicinity of the joint 81B of the left side frame 81, while a mounting seat 80M is attached on the top of the swing bracket 80F. A front support plate 81G is supported by the leg plate 81F and the mounting seat 80M to extend in the transverse direction. The front support plate 81G rotatably supports the front of the cab unit 62 via hinge mechanisms 83 (see FIG. 12) which will be explained later.

Figure 11:
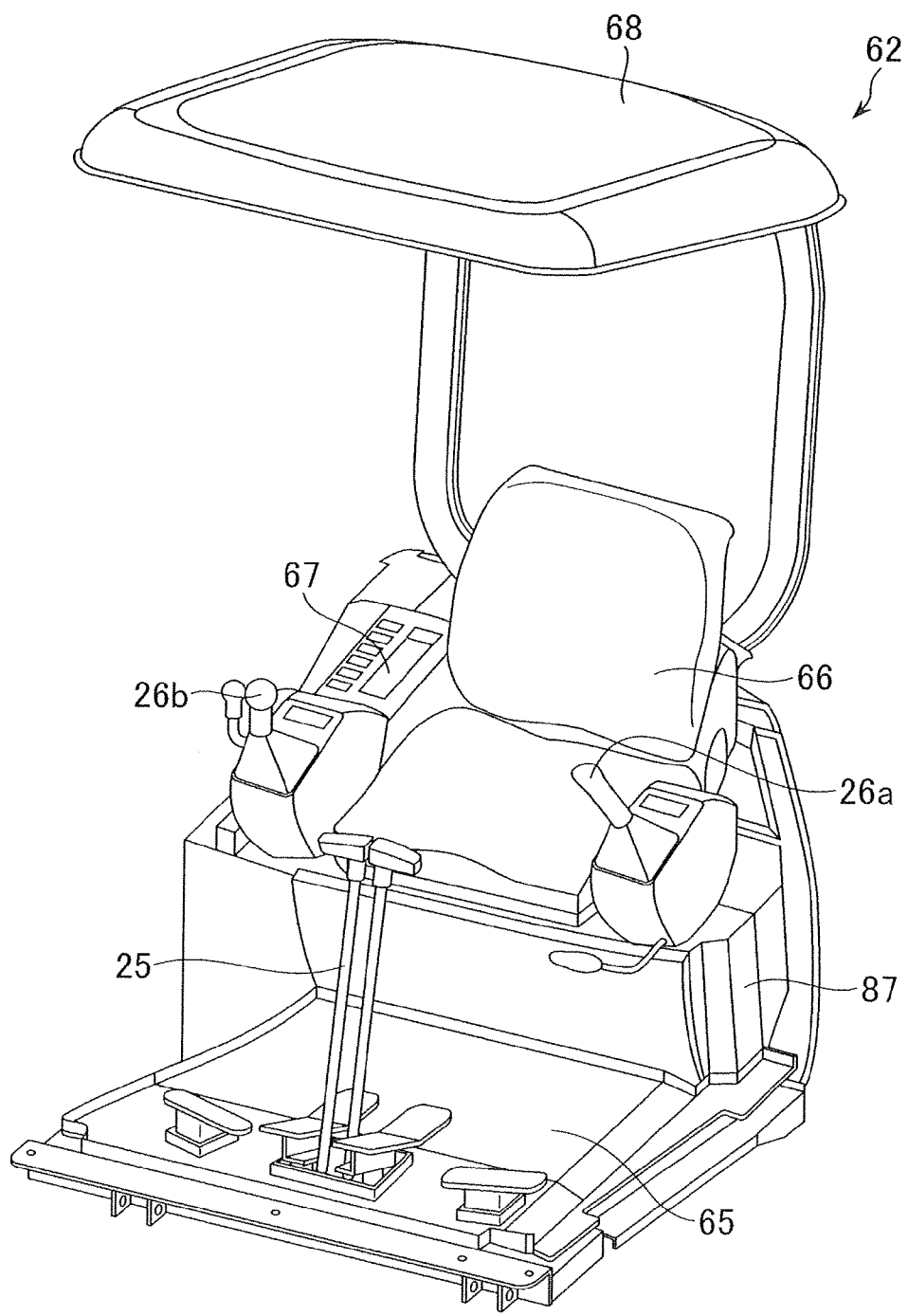
FIG. 11 is a perspective view showing the structure of the cab unit in the embodiment of the present invention.
Figure 12:
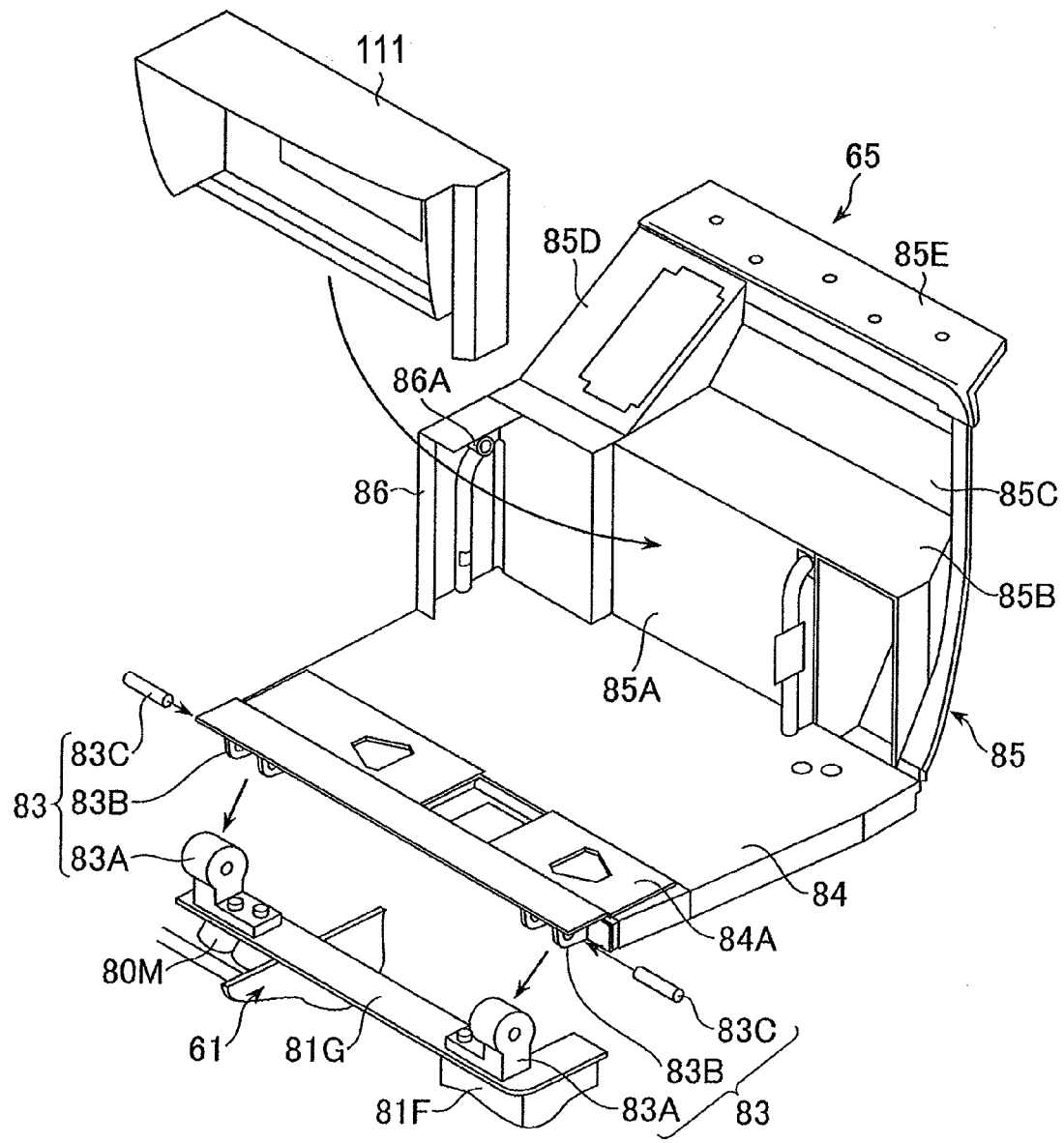
FIG. 12 is a perspective view showing the structure of a floor member constituting the cab unit in the embodiment of the present invention.

FIG. 11 is a perspective view showing the structure of the cab unit 62. FIG. 12 is a perspective view showing the structure of a floor member constituting the cab unit 62.

In FIGS. 11 and 12 and FIGS. 7 and 8 which have been explained above, the cab unit 62 includes a floor member 65 mounted on the swiveling frame 61 to be tiltable around its front serving as a fulcrum, a cab seat 66 mounted on the floor member 65, the controller device 25 arranged in front of the cab seat 66 to let the operator command the traveling of the lower travel structure 50, a controller device 26a (cross-hair four-way operation type) arranged to the left of the cab seat 66 to let the operator command the swiveling of the upper swing structure 60 and the rotation of the arm 73, a controller device 26b (cross-hair four-way operation type) arranged to the right of the cab seat 66 to let the operator command the rotations of the bucket 74 and the boom 72, a switch box 67 arranged to the right of the cab seat 66, and a canopy 68 (with two pillars, for example) covering the top of the cab seat 66, etc.

The floor member 65 mainly includes a floor plate 84 serving as the foothold for the operator, a cab seat pedestal 85 extending upward from the rear of the floor plate 84 to overhang rearward, and a right side plate 86 extending upward from the right edge of the floor plate 84. A sleeve 86A for attaching a movable member 96 of a tilt keeping mechanism 91 (see FIG. 14, explained later) is formed in an upper part of the right side plate 86.

The front part of the floor plate 84 is used as a lever/pedal mounting part 84A for mounting the traveling controller device 25, etc. Right and left hinge mechanisms 83 are arranged between the front end of the floor plate 84 and the aforementioned front support plate 81G of the swiveling frame 61. Each hinge mechanism 83 includes a bracket 83A attached to the front support plate 81G of the swiveling frame 61, a bracket 83B attached to the front end of the floor plate 84, a connecting pin 83C rotatably connecting the brackets 83A and 83B, and rubber (unshown) inserted between the bracket 83A and the connecting pin 83C.

The cab seat pedestal 85 includes a vertical plate part 85A extending vertically from the rear of the floor plate 84, a seat support plate part 85B extending rearward from the top of the vertical plate part 85A, a backboard part 85C extending upward and slightly rearward from the rear of the seat support plate part 85B, a box mounting plate part 85D situated to the right of the seat support plate part 85B and the backboard part 85C, and a roof mounting plate part 85E extending rearward from the tops of the backboard part 85C and the box mounting plate part 85D. A front pedestal 111 is attached to the vertical plate part 85A of the cab seat pedestal 85. The cab seat 66 is attached on the front pedestal 111 and the seat support plate part 85B of the cab seat pedestal 85. The switch box 67 is mounted on the box mounting part 85D of the cab seat pedestal 85. The two-pillar canopy 68 is mounted on the roof mounting plate part 85E of the cab seat pedestal 85 using bolts, etc.

Figure 13:
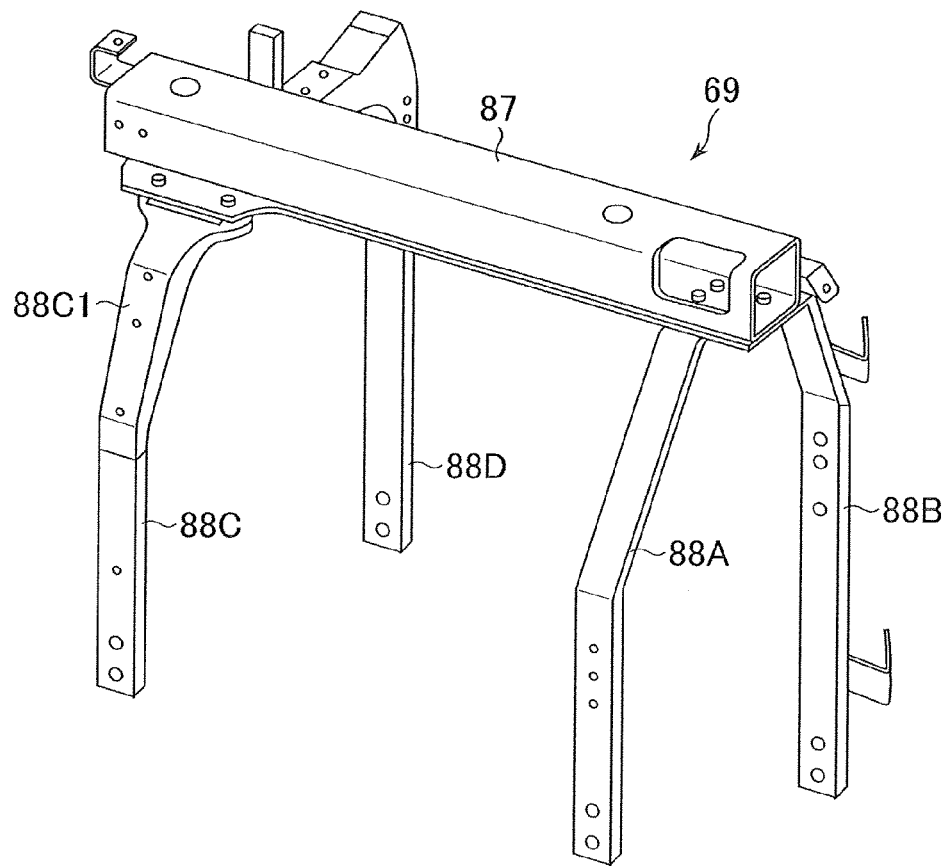
FIG. 13 is a perspective view showing the structure of a support member in the embodiment of the present invention.

The floor member 65 (i.e., the cab unit 62) is capable of tilting via the aforementioned hinge mechanisms 83. In the state of FIG. 7 in which the rear part of the floor member 65 (i.e., the rear part of the cab unit 62) is lowered (tilt down state), the rear part (specifically, the roof mounting plate part 85E) is supported by a support member 69, etc. FIG. 13 is a perspective view showing the structure of the support member 69.

Referring to FIG. 13, the support member 69 includes a pedestal 87 in a shape like a rectangular prism extending in the transverse direction and a left front support 88A, a left rear support 88B, a right front support 88C and a right rear support 88D supporting the pedestal 87. The supports 88A-88D of the support member 69 are bent so as to extend over the engine 11 mounted on the swiveling frame 61 and then attached to the swiveling frame 61 (see FIGS. 17-19 which will be explained later). Specifically, the lower ends of the left front support 88A and the right front support 88C are attached to the front of the transverse plate 80G of the swiveling frame 61 using bolts, etc. The lower end of the left rear support 88B is attached to the front of the connecting fitting 81E of the swiveling frame 61 using bolts, etc. The lower end of the right rear support 88D is attached to the front of the support fitting 80J of the swiveling frame 61 using bolts, etc.

On the pedestal 87 of the support member 69, a setting table 89 (see FIG. 19 which will be explained later) extending in the transverse direction is mounted via two vibration-proof mounts. A rear part of the cab unit 62 in the tilt down state (specifically, the aforementioned roof mounting plate part 85E of the floor member 65) is supported on the setting table 89 and is further fixed on the setting table 89 in a detachable manner using bolts, etc. In order to cover the gap between the rear of the cab unit 62 in the tilt down state and the top of the counter weight 63, a plate cover 90 (see FIG. 16 which will be explained later) is attached to the rear of the pedestal 87 of the support member 69 via a metal fitting (unshown) having a cross-sectional shape like "L".

Figure 14:
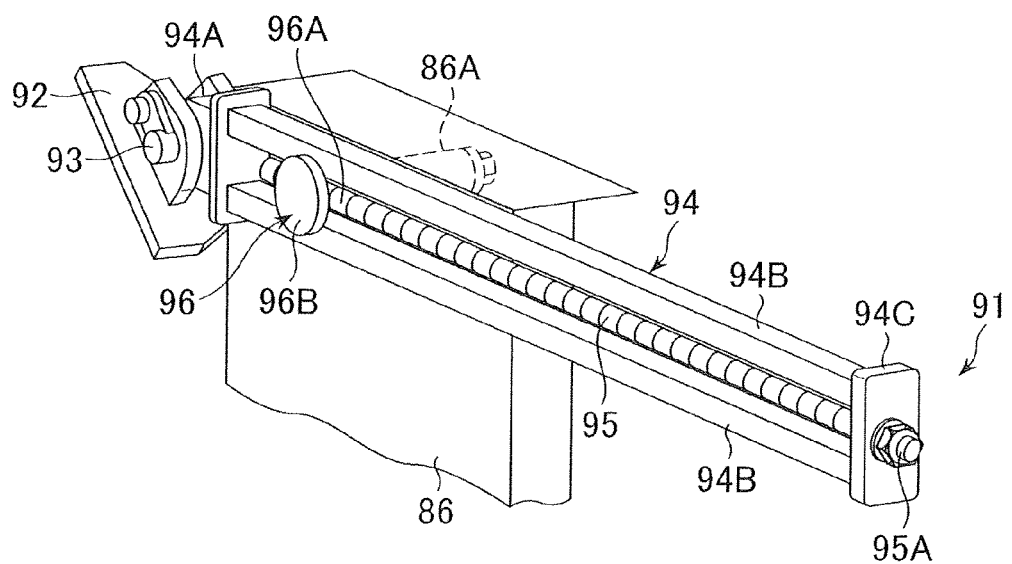
FIG. 14 is a perspective view showing the structure of a tilt keeping mechanism in the embodiment of the present invention.

The tilt keeping mechanism 91 for keeping the cab unit 62 in a tilt up state is mounted on a slope part 88C1 of the right front support 88C of the support member 69 using bolts, etc. FIG. 14 is a perspective view showing the structure of the tilt keeping mechanism 91.

Referring to FIG. 14, the tilt keeping mechanism 91 includes a bracket 92 attached to the slope part 88C1 of the right front support 88C of the support member 69, a guide rail 94 rotatably connected to the bracket 92 via a connecting pin 93, a screw shaft 95 installed in the guide rail 94 to be rotatable, and a movable member 96 engaged with the screw shaft 95.

The guide rail 94 includes a proximal end part 94A rotatably connected to the bracket 92 via the connecting pin 93, a pair of rail parts 94B extending in parallel from the proximal end part 94A, and a distal end part 94C connecting the distal ends of the rail parts 94B together.

The screw shaft 95 is arranged in the gap between the rail parts 94B of the guide rail 94. The distal end of the screw shaft 95, penetrating the distal end part 94C of the guide rail 94, is rotatably supported by a thrust bearing (unshown) of the distal end part 94C. The proximal end of the screw shaft 95 is left as a free end that is a prescribed distance apart from the proximal end part 94A of the guide rail 94. A tool connecting part 95A (in a hexagonal shape, for example) is joined to the distal end of the screw shaft 95 protruding from the distal end part 94C of the guide rail 94.

The movable member 96 includes a cylindrical shaft body 96A whose diameter is smaller than the gap between the rail parts 94B of the guide rail 94 and a flange part 96B whose diameter is larger than the gap between the rail parts 94B. The shaft body 96A of the movable member 96 has a tapped hole (screw hole) penetrating the shaft body 96A in its radial direction. The screw shaft 95 is engaged with the tapped hole. The end of the shaft body 96A of the movable member 96 is rotatably inserted into the sleeve 86A of the right side plate 86 of the floor member 65 and retained by a bolt so as not to come off.

Figure 15:
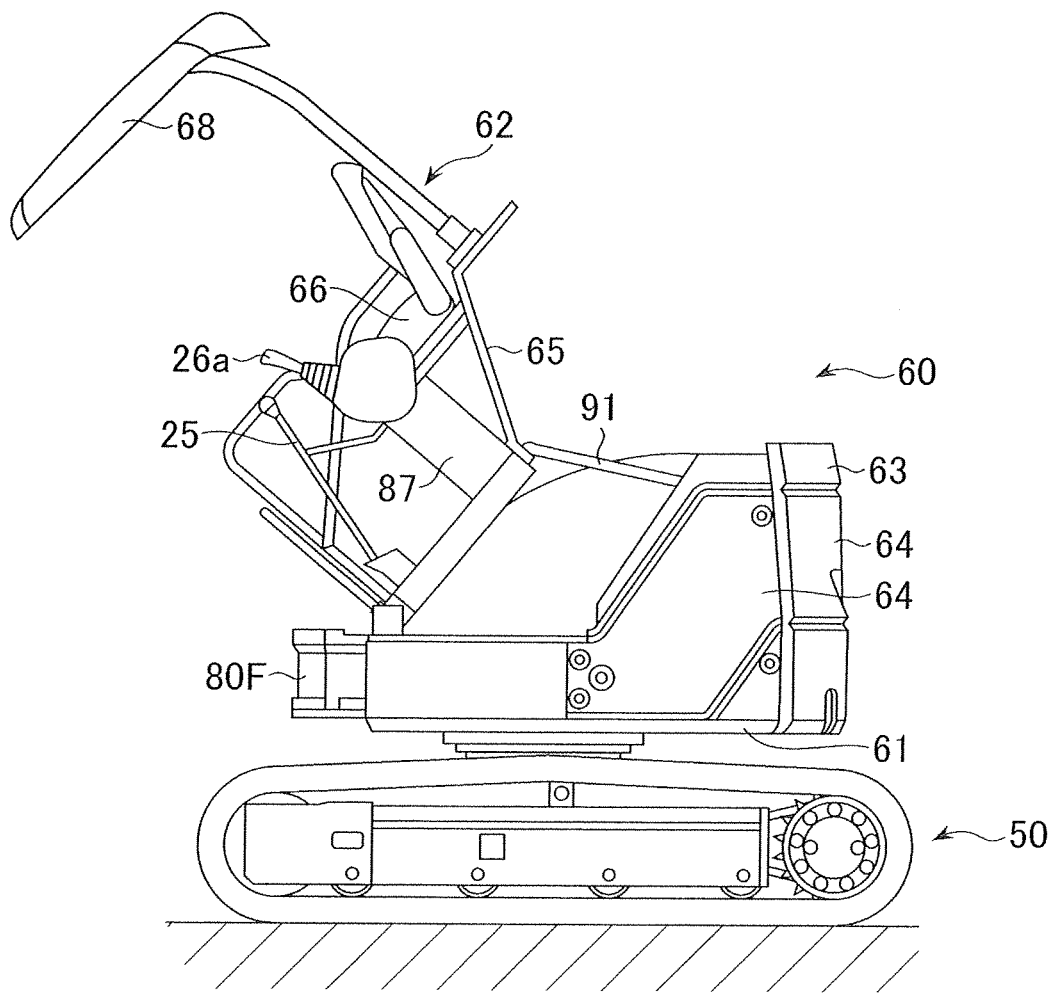
FIG. 15 is a side view showing the external appearance of the hybrid mini-shovel (tilt up state of the cab unit) in accordance with the embodiment of the present invention.

When the screw shaft 95 is rotated with a tool (e.g., wrench) connected to the tool connecting part 95A of the screw shaft, the movable member 96 guided by the rail parts 94B of the guide rail 94 moves in the axial direction of the screw shaft 95. The floor member 65 (i.e., the cab unit 62) is tilted at a desired tilt angle corresponding to the moving distance of the movable member 96 and is kept in the tilted state (see FIG. 15).

Next, the arrangement (layout) of devices on the swiveling frame 61, as the most significant feature of this embodiment, will be described.

Figure 16:
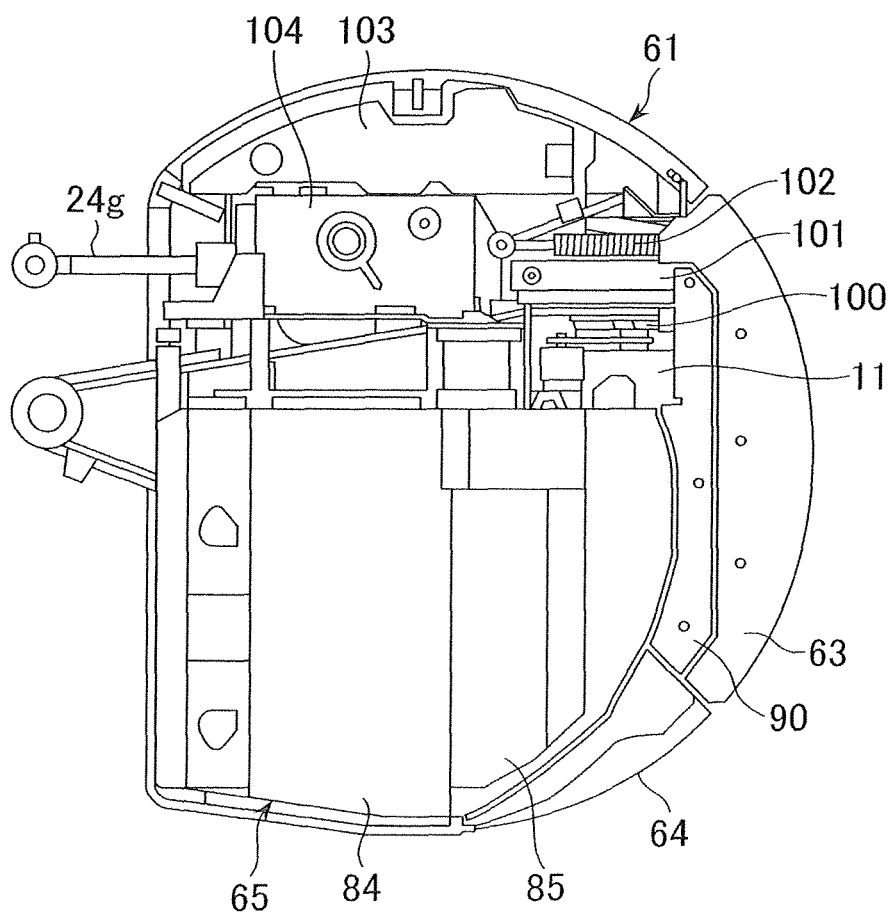
FIG. 16 is a plan view showing the arrangement of the floor member on the swiveling frame for explaining the device arrangement on the swiveling frame in the embodiment of the present invention.
Figure 17:
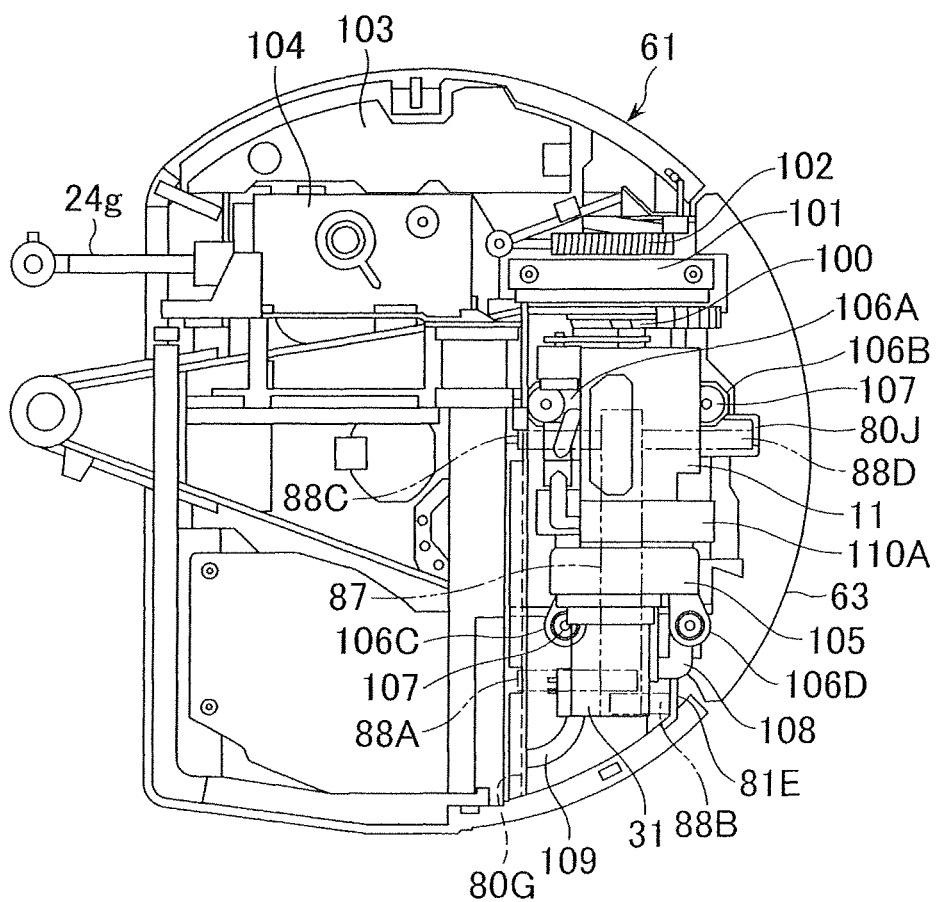
FIG. 17 is a plan view showing the device arrangement on the swiveling frame (a state in which the floor member, the support member, exterior covers, etc. have been removed from the mini-shovel shown in FIG. 16) in the embodiment of the present invention.
Figure 18:
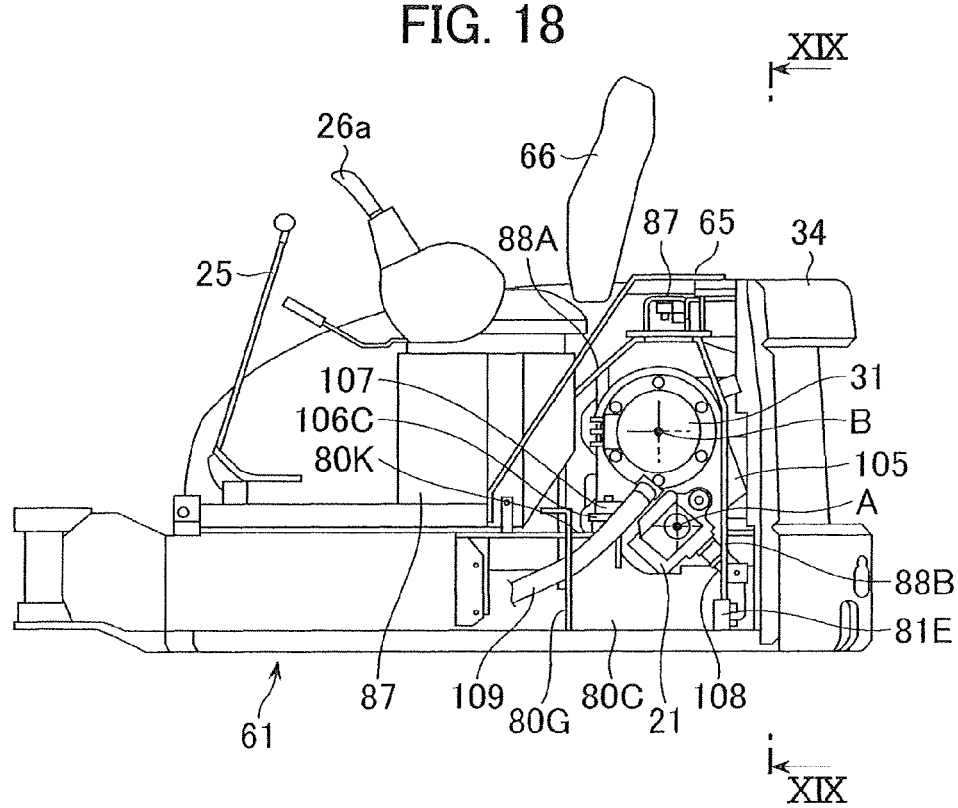
FIG. 18 is a side view showing the device arrangement on the swiveling frame in the embodiment of the present invention.
Figure 19:
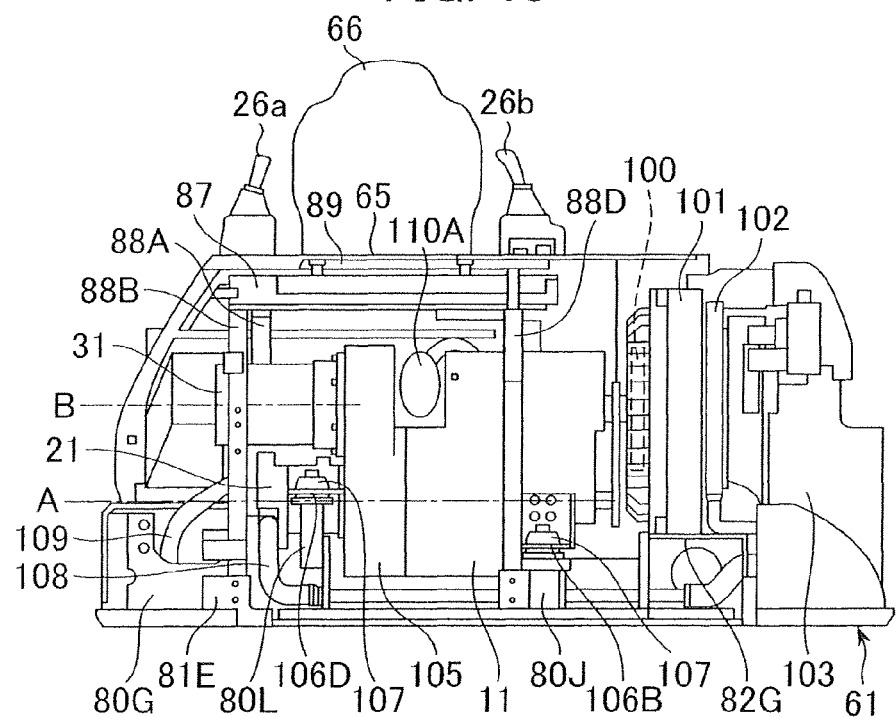
FIG. 19 is a rear cross-sectional view taken along the cross section XIX-XIX shown in FIG. 18.

FIG. 16 is a plan view showing the arrangement of the floor member 65 on the swiveling frame 61 in this embodiment. FIG. 17 is a plan view showing the device arrangement on the swiveling frame 61 (a state in which the floor member 65, the support member 69, the exterior covers 64, etc. have been removed from the mini-shovel shown in FIG. 16). FIG. 18 is a side view showing the device arrangement on the swiveling frame 61 in this embodiment, where the exterior covers 64 is left out for convenience. FIG. 19 is a rear cross-sectional view taken along the cross section XIX-XIX shown in FIG. 18. In FIG. 17, the support member 69 (specifically, the pedestal 87, the left front support 88A, the left rear support 88B, the right front support 88C and the right rear support 88D) is indicated with two-dot chain lines. In FIGS. 18 and 19, the shaft-center position of the output shaft 11a of the engine 11 and the input shaft 21a of the hydraulic pump 21 is indicated with chain lines A and the shaft-center position of the rotating shaft 31a of the generator/motor 31 is indicated with chain lines B.

Referring to FIGS. 16-19, the engine 11 is installed in an engine room (machine room) formed in a rear part of the space on the swiveling frame 61 between the counter weight 63 and the cab seat pedestal 85 of the floor member 65. Specifically, the cab seat pedestal 85 of the floor member 65 covers the front and top of the engine 11, while the counter weight 63 covers the rear of the engine 11.

The engine 11 is mounted transversely (to extend in the transverse direction) on the swiveling frame 61 at a position between the rear longitudinal plates 80C and 80E. The right-hand end of the output shaft 11a of the engine 11 is connected to the rotating shaft of a cooling fan 100 via a power transmission mechanism (specifically, pulleys, fan belt, etc.). A radiator 101, an oil cooler 102, etc. are arranged to the right of the cooling fan 100 (specifically, on the mounting plate 82G of the swiveling frame 61). A fuel tank 103, a hydraulic fluid tank 104, etc. are arranged in front of the radiator 101, the oil cooler 102, etc. (i.e., to the right of the floor member 65). Although not shown in FIG. 17, the control valve 23 is arranged under the floor plate 84 of the floor member 65 (specifically, on a bottom cover situated in front of the overhang beam 81D of the swiveling frame 61).

As shown in FIG. 19 and in FIG. 1 which has been explained above, the left-hand end of the output shaft 11a of the engine 11 is coaxially connected to the input shaft 21a of the hydraulic pump 21. These shafts 11a and 21a of the engine 11 and the hydraulic pump 21 are connected to the rotating shaft 31a of the generator/motor 31 via the gear mechanism 6. A gear box 105 storing the gear mechanism 6 is configured so that its right-hand part is connected to the engine 11 and its left-hand part supports the hydraulic pump 21 and the generator/motor 31. Thus, the engine 11, the hydraulic pump 21 and the generator/motor 31 are integrally connected together via the gear box 105 to form a power unit.

The engine 11 is provided with two support brackets 106A and 106B apart from each other in the longitudinal direction. Similarly, the gear box 105 is provided with two support brackets 106C and 106D apart from each other in the longitudinal direction. The support bracket 106A is attached to the engine support part 80I of the swiveling frame 61 via a vibration-proof mount 107. The support bracket 106B is attached to the support fitting 80J of the swiveling frame 61 via a vibration-proof mount 107. The support bracket 106C is attached to the support fitting 80K of the swiveling frame 61 via a vibration-proof mount 107. The support bracket 106D is attached to the support fitting 80L of the swiveling frame 61 via a vibration-proof mount 107. To sum up, the power unit is supported on the swiveling frame 61 via the support bracket 106A-106D and the vibration-proof mounts 107.

The generator/motor 31 is placed at a vertical position where its lower end is situated above the shaft center of the input shaft 21a of the hydraulic pump 21 and it does not overlap with the hydraulic pump 21 when viewed from the rear (as shown in FIG. 19) and at a horizontal position where it overlaps with the hydraulic pump 21 when viewed from above (as shown in FIG. 17). Specifically, the generator/motor 31 is placed so as not to interfere with the hydraulic pump 21, an inlet-side hydraulic pipe 108 connected to the hydraulic pump 21 (specifically, hydraulic pipe from the hydraulic fluid tank 104), an outlet-side hydraulic pipe 109 connected to the hydraulic pump 21 (specifically, hydraulic pipe to the control valve 23), the support brackets 106C and 106D of the gear box 105 and the vibration-proof mounts 107, or the support member 69.

The actions and effects of this embodiment configured as above will be described below by using a comparative example.

Figure 20:
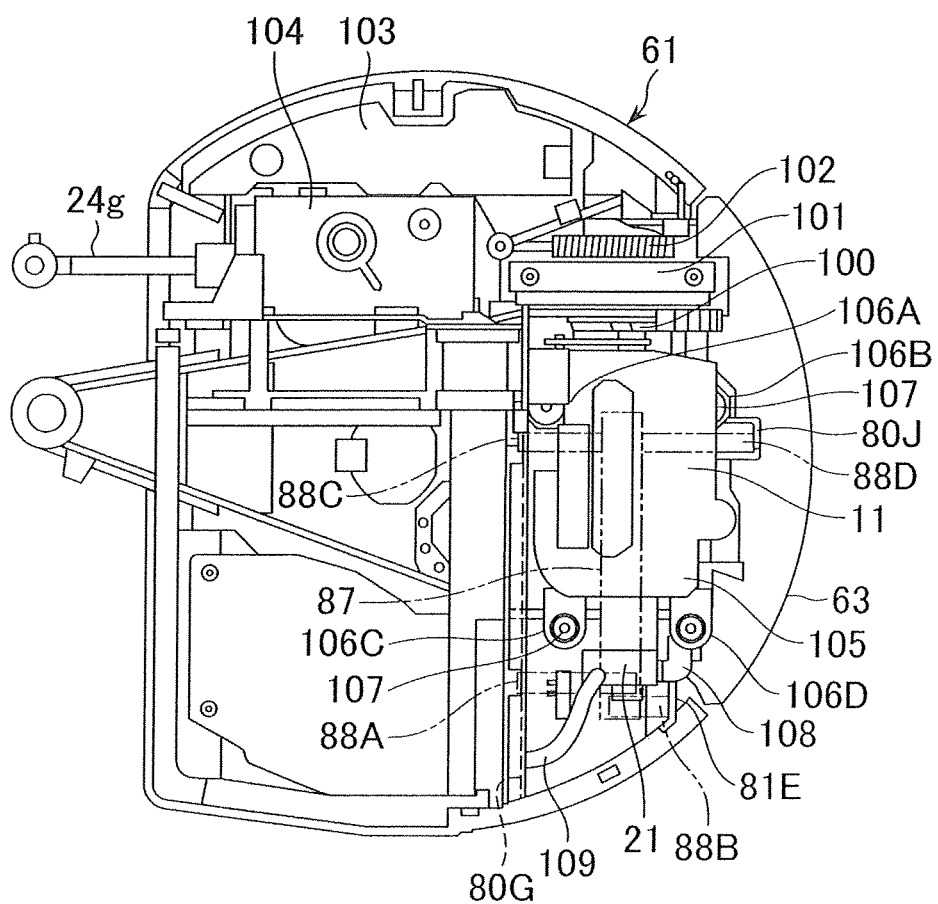
FIG. 20 is a plan view showing the device arrangement on the swiveling frame in an engine-powered mini-shovel as a comparative example.
Figure 21:
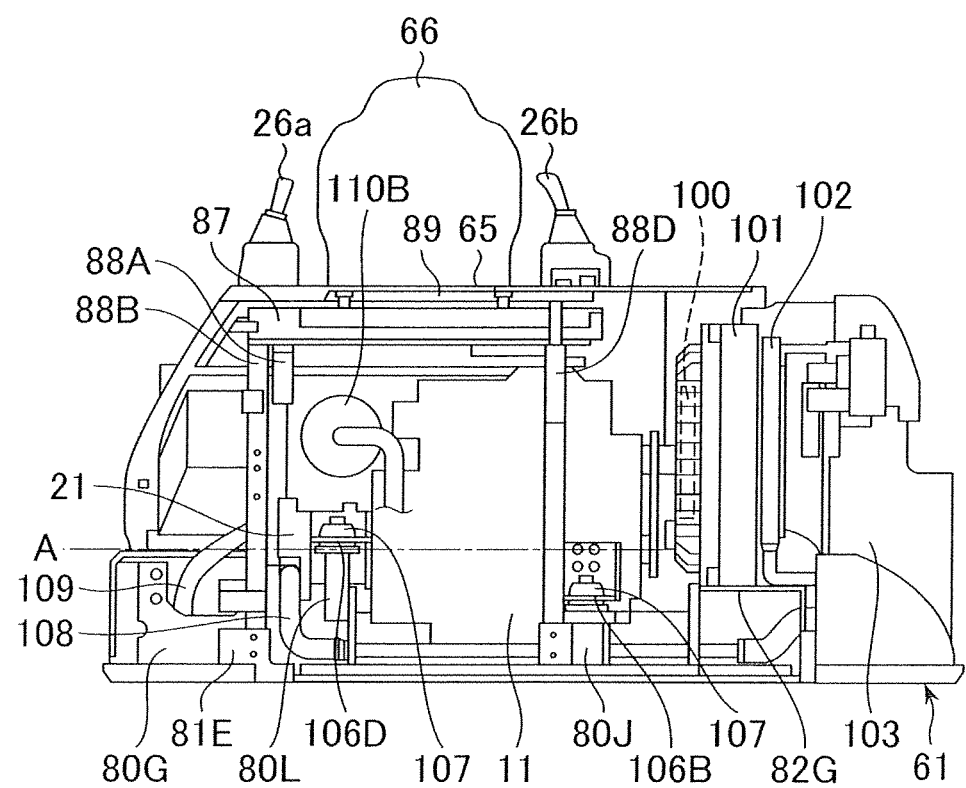
FIG. 21 is a rear cross-sectional view showing the device arrangement on the swiveling frame in the engine-powered mini-shovel as the comparative example.

FIG. 20 is a plan view showing the device arrangement on the swiveling frame 61 in an engine-powered mini-shovel as a comparative example (corresponding to FIG. 17 explained above), wherein an exhaust muffler 110B is unshown for convenience. FIG. 21 is a rear cross-sectional view showing the device arrangement on the swiveling frame 61 in the engine-powered mini-shovel as the comparative example (corresponding to FIG. 19 explained above).

In this engine-powered mini-shovel, a part of the space over the hydraulic pump 21 is used for arranging the exhaust muffler 110B and the remaining part of the space is left unused (dead space). In contrast, in the hybrid mini-shovel of this embodiment, the space over the hydraulic pump 21 is utilized efficiently for arranging the generator/motor 31. Especially in the hybrid mini-shovel of this embodiment in which the generator/motor 31 performs the assistant driving of the hydraulic pump 21, the engine 11 and its auxiliary devices (e.g., exhaust muffler 110A) are downsized compared to those in engine-powered mini-shovels by reducing the output power of the engine 11. Thus, the space for arranging the gear box 105 can be secured. Further, by the downsizing and rearrangement of the exhaust muffler 110A, the space over the hydraulic pump 21 (i.e., the space for arranging the generator/motor 31) can be reserved securely.

Therefore, in the hybridization (conversion, redesigning, etc. into a hybrid mini-shovel) based on an engine-powered mini-shovel of the minimal tail swing radius type, the arrangement of the other devices on the swiveling frame 61 (specifically, the radiator 101, the oil cooler 102, the fuel tank 103, the hydraulic fluid tank 104, etc.) can be kept unchanged. Also for the power unit, the arrangement of the hydraulic pump 21 can be kept unchanged from that in the engine-powered mini-shovel and the hydraulic pipes 108 and 109 connected to the hydraulic pump 21 can be standardized (i.e., the same hydraulic pipes 108 and 109 can be used in common for both engine-powered mini-shovels and hybrid mini-shovels).

In the engine-powered mini-shovel, the support brackets 106A-106D are attached to the engine 11 only and the power unit (made up of the engine 11 and the hydraulic pump 21 integrally connected together) is supported on the swiveling frame 61 via the support brackets 106A-106D and vibration-proof mounts 107.

On the other hand, in the hybrid mini-shovel of this embodiment in which the engine 11 is downsized by reducing the output power of the engine 11, the arrangement of the support brackets 106A-106D (i.e., supporting positions of the power unit) is necessitated to differ from that in the engine-powered mini-shovel if the support brackets 106A-106D are attached to the engine 11 only. Therefore, by attaching the support brackets 106A and 106B to the engine 11 and the support brackets 106C and 106D to the gear box 105 as in this embodiment, the supporting positions of the power unit can be made identical with those in the engine-powered mini-shovel and the swiveling frame 61 can be standardized (i.e., the same swiveling frame 61 can be used in common for both engine-powered mini-shovels and hybrid mini-shovels). Consequently, the costs for development and manufacture can be reduced considerably while also facilitating the conversion from the already-existing engine-powered mini-shovels to hybrid mini-shovels.

As described above, according to the hybrid mini-shovel of this embodiment, the hybridization based on an engine-powered mini-shovel of the minimal tail swing radius type can be carried out with ease.

Incidentally, while the supporting positions of the power unit in the hybrid mini-shovel are made identical with those in the engine-powered mini-shovel in the above embodiment, the design of the hybrid mini-shovel is not to be restricted to such an example; the supporting positions of the power unit may also differ from those in the engine-powered mini-shovel. While the engine 11 and its auxiliary devices (e.g., the exhaust muffler 110A) are downsized compared to those in the engine-powered mini-shovel by reducing the output power of the engine 11 in the above embodiment, the output power of the engine 11 may also be set equal to that in the engine-powered mini-shovel as long as the space for arranging the gear box 105 and the generator/motor 31 can be secured.

While a mini-shovel of the minimal tail swing radius type has been taken as an example of the target of application of the present invention in the above explanation, the present invention is applicable also to mini-shovels of the minimal swing radius type. Further, besides mini-shovels of the minimal tail swing radius type or the minimal swing radius type, the present invention is applicable also to other construction machines such as hydraulic cranes of the minimal tail swing radius type or the minimal swing radius type.

DESCRIPTION OF REFERENCE CHARACTERS 6 gear mechanism
11 engine
11a output shaft
21 hydraulic pump
21a input shaft
24a traveling hydraulic motor
24b traveling hydraulic motor
24c boom hydraulic cylinder
24d arm hydraulic cylinder
24e bucket hydraulic cylinder
24f swiveling hydraulic motor
24g swing hydraulic cylinder
24h blade hydraulic cylinder
25 traveling controller device
31 generator/motor
31a rotating shaft
33 battery (electricity storage device)
41 traveling speed selector switch
46 vehicle body controller (control device)
50 lower travel structure
60 upper swing structure
61 swiveling frame
63 counter weight
65 floor member
69 support member
71 front work implement
84 floor plate
85 cab seat pedestal

105 gear box
106A-106D support bracket

The invention claimed is:

1. A hybrid construction machine of minimal tail swing radius type or minimal swing radius type comprising:
    a lower travel structure;
    an upper swing structure which is mounted on the lower travel structure to be capable of swiveling;
    a work implement which is connected to the upper swing structure to be capable of increasing and decreasing its elevation angle;
    a plurality of hydraulic actuators including a traveling hydraulic motor;
    an engine;
    a hydraulic pump having an input shaft coaxially connected to an output shaft of the engine and supplying hydraulic fluid to the hydraulic actuators;
    a generator/motor whose rotating shaft is connected to the output shaft of the engine and the input shaft of the hydraulic pump via a gear mechanism; and
    an electricity storage device which receives and supplies electric power from/to the generator/motor,
    the upper swing structure including:
        a swiveling frame which forms the substructure of the upper swing structure;
        a counter weight which is provided at a rear end position on the swiveling frame to cover the rear of the engine;
        a floor member which is mounted on the swiveling frame, the floor member including a floor plate serving as the foothold for the operator and a cab seat pedestal extending upward from the rear of the floor plate to overhang rearward and cover the front and top of the engine; and
        a support member which is mounted on the swiveling frame to extend over the engine and support a rear part of the floor member,
    wherein the generator/motor is placed at a vertical position where the lower end of the generator/motor is situated above the shaft center of the input shaft of the hydraulic pump, and when viewed from above at a horizontal position where the generator/motor overlaps with the hydraulic pump.

2. The hybrid construction machine according to claim 1, further comprising:
    a traveling speed selector switch capable of commanding switching of the traveling hydraulic motor between a low-speed large-displacement mode and a high-speed small-displacement mode; and
    a control device which executes control to compensate for shortage of output torque of the engine by making the generator/motor operate as an electric motor by driving the generator/motor with electric power from the electricity storage device in a high-speed traveling state as an operating state in which the traveling speed selector switch is commanding the high-speed small-displacement mode and a traveling controller device is being operated,
    wherein output power of the engine is set at a level insufficient for the engine to cover hydraulic power required of the hydraulic pump in the high-speed traveling state.

3. The hybrid construction machine according to claim 2, further comprising a gear box which is attached to the engine to store the gear mechanism and support the hydraulic pump and the generator/motor, wherein:
    a plurality of support brackets are attached to the engine and the gear box, and
    a power unit formed by integrally connecting the engine, the hydraulic pump and the generator/motor together via the gear box is mounted on the swiveling frame via the support brackets.

4. The hybrid construction machine according to claim 3, wherein the generator/motor is placed at a vertical position where the generator/motor does not overlap with the hydraulic pump when viewed from the rear so that the generator/motor does not interfere with components such as the support brackets attached to the gear box.

* * * * *